(12) United States Patent
Van Deventer

(10) Patent No.: US 11,182,971 B2
(45) Date of Patent: Nov. 23, 2021

(54) AUGMENTED REALITY SYSTEM AND METHODS FOR INDICATING MOVEMENT OR STATUS OF A NUMBER OF VEHICLES WITHIN AN ENVIRONMENT

(71) Applicant: The Boeing Company, Chicago, IL (US)

(72) Inventor: Bruce Van Deventer, Everett, WA (US)

(73) Assignee: The Boeing Company, Chicago, IL (US)

(*) Notice: Subject to any disclaimer, the term of this patent is extended or adjusted under 35 U.S.C. 154(b) by 36 days.

(21) Appl. No.: 16/712,667

(22) Filed: Dec. 12, 2019

(65) Prior Publication Data

US 2021/0183148 A1    Jun. 17, 2021

(51) Int. Cl.
*G06T 19/00* (2011.01)
*G06F 3/01* (2006.01)
*G06K 9/00* (2006.01)
*G02B 27/01* (2006.01)
*G06F 3/0481* (2013.01)

(52) U.S. Cl.
CPC .......... *G06T 19/006* (2013.01); *G02B 27/017* (2013.01); *G06F 3/016* (2013.01); *G06F 3/04812* (2013.01); *G06K 9/00671* (2013.01); *G06T 19/003* (2013.01); *G02B 2027/0178* (2013.01)

(58) Field of Classification Search
CPC ... G06T 19/006; G06T 19/003; G02B 27/017; G02B 2027/0178; G06K 9/00671; G06F 3/016; G06F 3/04812
See application file for complete search history.

(56) References Cited

U.S. PATENT DOCUMENTS

| | | | |
|---|---|---|---|
| 9,881,425 B1 | 1/2018 | Scott et al. | |
| 2007/0273557 A1* | 11/2007 | Baillot | G05D 1/0033 340/988 |
| 2013/0138267 A1* | 5/2013 | Hignite | G08G 1/096775 701/2 |
| 2014/0022281 A1 | 1/2014 | Georgeson et al. | |
| 2016/0085426 A1 | 3/2016 | Scott | |
| 2019/0340909 A1* | 11/2019 | Nguyen | G08B 21/02 |
| 2020/0262424 A1* | 8/2020 | Kong | G05D 1/0278 |

* cited by examiner

*Primary Examiner* — Tapas Mazumder
(74) *Attorney, Agent, or Firm* — Yee & Associates, P.C.

(57) ABSTRACT

An augmented reality system and methods of indicating at least one of a status or a movement of vehicles within an environment are presented. An augmented reality system comprises a number of vehicles within an environment and an augmented reality device configured to receive the data from the number of vehicles and present augmented reality information in association with a live view of the environment in the augmented reality device using the data from the number of vehicles and an environment model. The number of vehicles is configured to output data comprising at least one of a current position, an objective, a vector, a current movement status, a vehicle type, or a current power status. The augmented reality information comprises indicators associated with at least one of movement of the number of vehicles or status of the number of vehicles.

21 Claims, 12 Drawing Sheets

FIG. 1

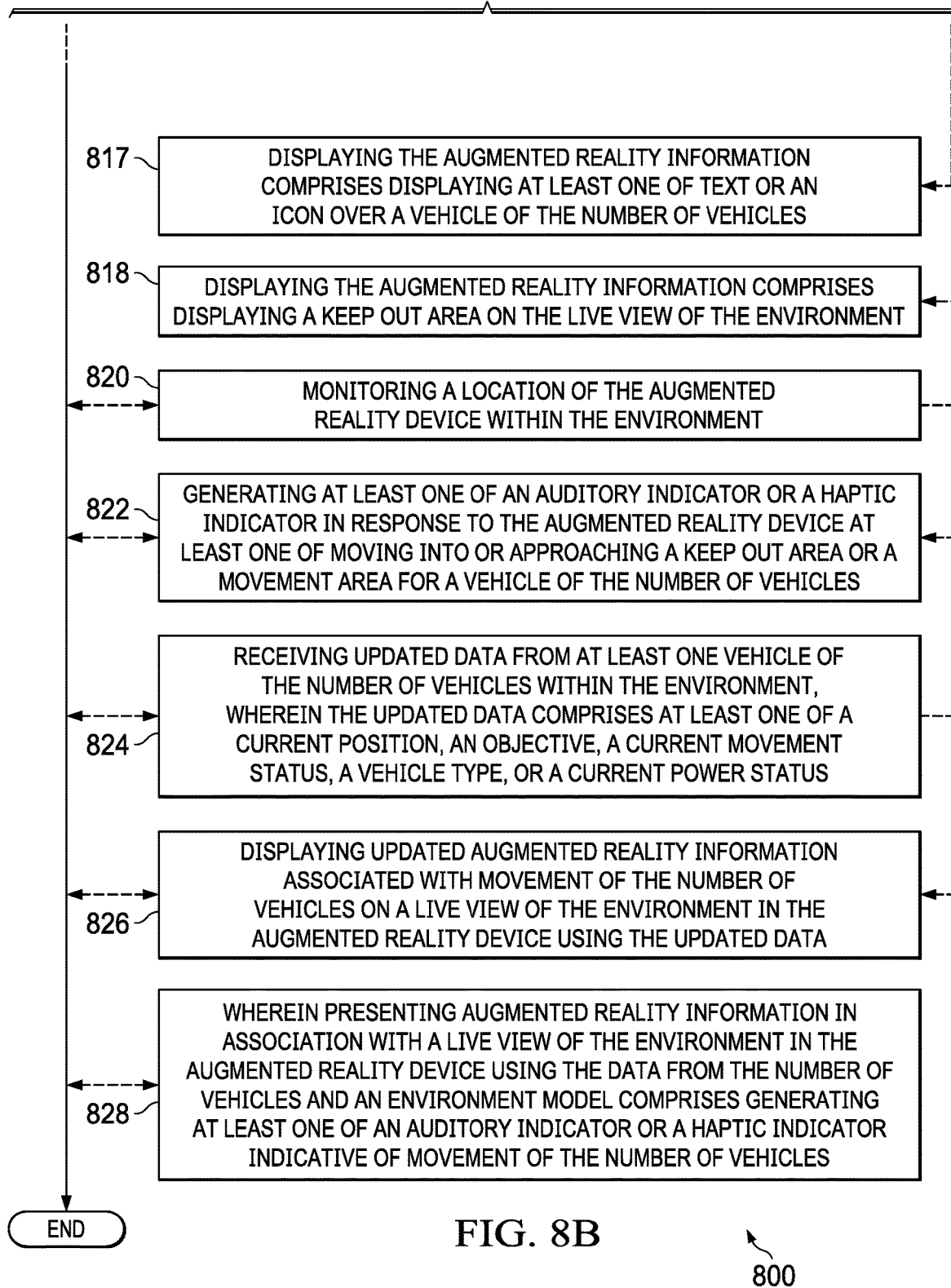

AUGMENTED REALITY SYSTEM AND METHODS FOR INDICATING MOVEMENT OR STATUS OF A NUMBER OF VEHICLES WITHIN AN ENVIRONMENT

BACKGROUND INFORMATION

1. Field

The present disclosure relates generally to performing operations in an environment and in particular, to a method, apparatus, and system for visualizing at least one of movement or status of vehicles within an environment using an augmented reality system.

2. Background

Human operators and vehicles work in close proximity in several environments such as manufacturing plants, warehouses, airports, construction work sites, and other environments. Currently radio communications and operator observations of the environment are the primary method of communicating movements of human operators and vehicles within environments. However, these methods may be undesirably inefficient and may result in undesired levels of risk.

For example, movement of vehicles within an environment poses risks to operators. To reduce risks to operators, "keep out" areas, low travel speeds, and other policies may be implemented. However, risk of collision or injury may still be undesirably high in some environments.

Therefore, it would be desirable to have a method and apparatus that take into account at least some of the issues discussed above, as well as other possible issues. For example, it would be desirable to have a method and apparatus that overcome a technical problem with reducing risk to operators within an environment shared with vehicles.

SUMMARY

An embodiment of the present disclosure provides an augmented reality system. The augmented reality system comprises a number of vehicles within an environment and an augmented reality device configured to receive the data from the number of vehicles and present augmented reality information in association with a live view of the environment in the augmented reality device using the data from the number of vehicles and an environment model, the augmented reality information comprising indicators associated with at least one of movement of the number of vehicles or status of the number of vehicles. The number of vehicles configured to output data comprising at least one of a current position, an objective, a vector, a current movement status, a vehicle type, or a current power status.

Another embodiment of the present disclosure provides a method of indicating movement of a number of vehicles within an environment. Data from the number of vehicles within the environment is received. The data comprises at least one of a current position, a vector, an objective, a current movement status, or a vehicle type. Augmented reality information is presented in association with a live view of the environment in the augmented reality device using the data from the number of vehicles and an environment model. The augmented reality information is indicative of movement of the number of vehicles Yet another embodiment provides a method of indicating status of vehicles within an environment. Data from the number of vehicles within the environment is received. The data comprises at least one of a current position, a current movement status, or a current power status. Augmented reality information is presented in association with a live view of the environment in the augmented reality device using the data from the number of vehicles and an environment model. The augmented reality information is indicative of status of the number of vehicles.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 1 is an illustration of a pictorial representation of a network of data processing systems in which illustrative embodiments may be implemented;

FIGS. 8A and 8B are an illustration of a flowchart of a method for indicating movement of a number of vehicles within an environment in accordance with an illustrative embodiment;

DETAILED DESCRIPTION

Figure 2:
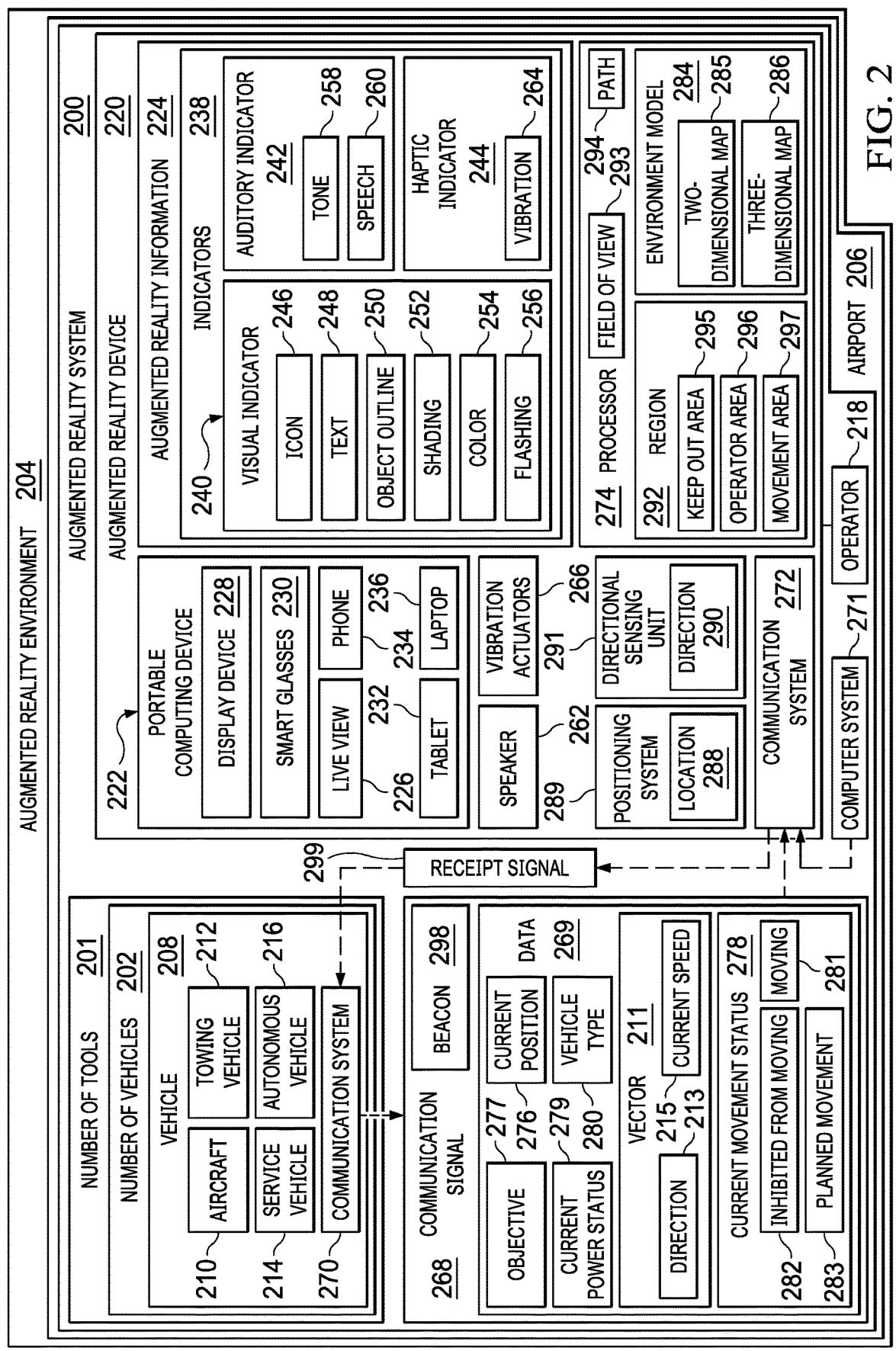
FIG. 2 is an illustration of a block diagram of an augmented reality system used for visualizing movement of vehicles within an airport in accordance with an illustrative embodiment.

The illustrative embodiments recognize and take into account one or more different considerations. For example, the illustrative embodiments recognize and take into account that providing information regarding movement or status of vehicles within an environment to an operator is desirable. The illustrative embodiments recognize and take into account that information regarding movement or status of vehicles within the environment is desirably provided in a way that is easily understood by an operator. The illustrative embodiments recognize and take into account that information regarding movement or status of vehicles within the environment is desirably provided in a way that does not distract an operator or detract from operations performed by the operator.

In one illustrative example, a method augments a live view of an environment. Data is received from a number of vehicles within the environment. The data includes any desirable data for identifying at least one of a movement or a status of the number of vehicles. In some illustrative examples, the data comprises at least one of a current position, an objective, a vector, a current movement status, or a vehicle type. The augmented reality information is presented in association with a live view of the environment in the augmented reality device using the data from the number of vehicles and an environment model. The augmented reality information increases at least one of efficiency, safety, or communication within the environment having the number of vehicles.

Figure 1:
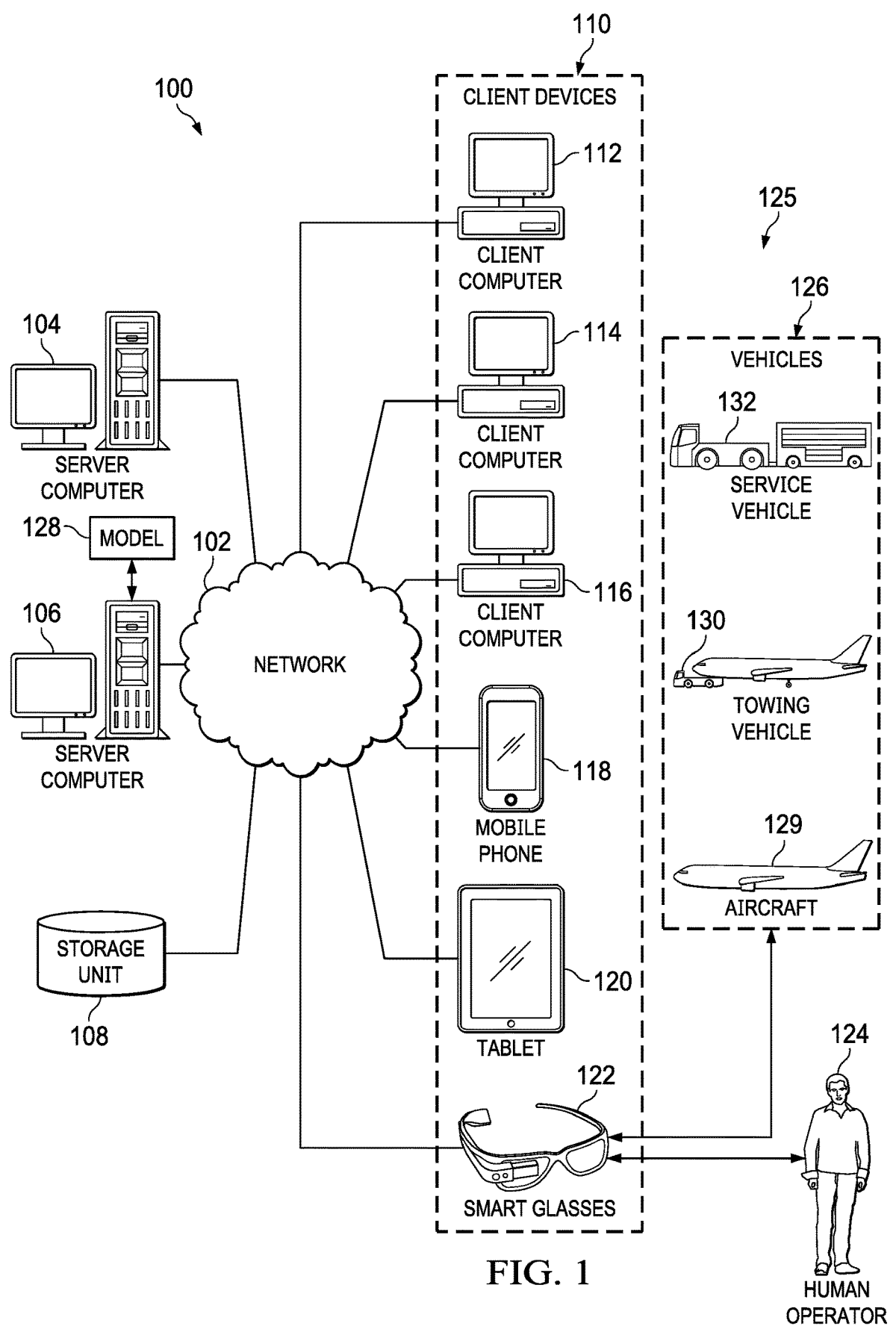

With reference now to the figures and, in particular, with reference to FIG. 1, an illustration of a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 and server computer 106 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, operator 124 operates smart glasses 122. Operator 124 can also be referred to as human operator. In this example, operator 124 moves within environment 125 having number of vehicles 126. Number of vehicles 126 includes any desirable type of vehicle within environment 125. As depicted, number of vehicles 126 includes aircraft 129, towing vehicle 130, and service vehicle 132. In some illustrative examples, at least one vehicle of number of vehicles 126 is autonomous or semi-autonomous.

In this illustrative example, number of vehicles 126 sends data to smart glasses 122. Number of vehicles 126 includes any desirable types of vehicles depending upon the type of environment 125. As depicted, number of vehicles 126 includes aircraft 129, towing vehicle 130, and service vehicle 132. In this illustrative example, service vehicle 132 is a luggage vehicle. A service vehicle is a vehicle that provides support within environment 125. When environment 125 is an airport, a service vehicle can include a fueling vehicle, a water and waste vehicle, a food service vehicle, a luggage vehicle, a passenger bus, or any desirable type of support vehicle. The data comprises at least one of a current position, a current movement status, or a current power status.

In this illustrative example, smart glasses 122 provide augmented reality information to operator 124 based on the data and model 128 of environment 125. The augmented reality information augments the live views seen through smart glasses 122. For example, the augmented reality information may take the form of at least one of a visual indicator, an auditory indicator, or a haptic indicator.

In one illustrative example, operator 124 operates an augmented reality device, such as smart glasses 122, to be notified of at least one of movement or status of number of vehicles 126 within environment 125. As depicted, server computer 106 sends model 128 of environment 125 to smart glasses 122 for use in displaying augmented reality information to augment a live view of environment 125 for operator 124.

In some illustrative examples, smart glasses 122 generates augmented reality information presented in association with the live view. In one example, smart glasses 122 generates augmented reality information including one of a keepout area or a warning area based on rules on smart glasses 122.

In some illustrative examples, a centralized control system provides at least one of rules for augmented reality information or the augmented reality information itself. In some illustrative examples, server computer 106 provides rules for generating augmented reality information presented by smart glasses 122. In some illustrative examples, server computer 106 provides at least some of the augmented reality information presented by smart glasses 122. For example, server computer 106 can provide at least one of a keepout area or a warning area to smart glasses 122.

The illustration of this example in FIG. 1 is not meant to limit the manner in which other illustrative examples can be implemented. For example, more than one human operator with smart glasses can be present in environment 125. In another illustrative example, environment 125 includes different types of vehicles 126 such as a personal vehicle, a crane, a bulldozer, a motorized cart, or any other desirable type of vehicle. In yet another illustrative example, operator 124 operates one of mobile phone 118 or tablet 120 instead of smart glasses 122.

Although environment 125 is depicted with number of vehicles 126, in some illustrative examples, environment 125 includes a number of tools that is not exclusively vehicles. For example, a number of tools includes any desirable type of tool within environment 125. The number of tools can include a manufacturing tool, a construction tool, an inspection tool, a communication tool, a vehicle, or any other type of tool. In these illustrative examples, the number of tools sends data to smart glasses 122. The number of tools includes any desirable types of tools depending upon the type of environment 125.

With reference to FIG. 2, an illustration of a block diagram of an augmented reality environment is depicted in accordance with an illustrative embodiment. The different hardware components in network data processing system 100 in FIG. 1 are examples of components that may be used in augmented reality environment 204.

Augmented reality system 200 is present within augmented reality environment 204. Augmented reality system 200 includes number of tools 201 within augmented reality environment 204. Number of tools 201 includes any desirable type of tool, such as a manufacturing tool, a construction tool, an inspection tool, a communication device, a vehicle, or any other type of tool. For example, number of tools 201 could include at least one of a drill, a saw, a cleaning machine, an inspection device, a communication device, a computing device, a vehicle, or any other type of tool that operator 218 within augmented reality environment 204 would desirably be aware of a presence, a status, or a movement of the tool. For example, it would be desirable for operator 218 to be aware of scheduled or impending operation of a tool with X-rays, or UV rays so that operator 218 will be outside of the region of operation of the UV tool or the X-ray tool. In another illustrative example, it would be desirable for operator 218 to be aware of operation of a crane or a low gantry system within augmented reality environment 204 so that operator 218 avoids interfering with operation of the crane or low gantry system. In some illustrative examples, number of tools 201 takes the form of number of vehicles 202 within augmented reality environment 204.

In some illustrative examples, augmented reality environment 204 is a high noise environment. When augmented reality environment 204 is a high noise environment, radio communication with operator 218 may be undesirably difficult. In some examples when augmented reality environment 204 is a high noise environment, operator 218 is wearing ear protection.

In some illustrative examples, augmented reality environment 204 is an area that is a permanent area with a fixed perimeter. In some illustrative examples, augmented reality environment 204 is a changeable area with variable perimeter. In some illustrative examples, augmented reality environment 204 is a temporary area. In some illustrative examples, the creation of augmented reality environment 204 is triggered by an event such as the arrival of a vehicle of number of vehicles 202.

Number of vehicles 202 take any desirable form. Number of vehicles 202 includes any desirable quantity of vehicles. As depicted, number of vehicles 202 includes vehicle 208.

In some illustrative examples, augmented reality environment 204 takes the form of airport 206. When augmented reality environment 204 takes the form of airport 206, vehicle 208 can be one of aircraft 210, towing vehicle 212, or service vehicle 214.

Service vehicle 214 is a vehicle that provides support within augmented reality environment 204. When augmented reality environment 204 takes the form of airport 206, service vehicle 214 can include a fueling vehicle, a water and waste vehicle, a food service vehicle, a luggage vehicle, a passenger bus, or any desirable type of support vehicle.

In some illustrative examples, vehicle 208 is autonomous vehicle 216. An autonomous vehicle is one that can maneuver without human intervention.

In some illustrative examples, vehicle 208 is semi-autonomous. A semi-autonomous vehicle can perform some actions, such as accelerating, braking, or maintaining a path, without human intervention.

Operator 218 is present within augmented reality environment 204 along with number of vehicles 202. Operator 218 can also be referred to as a human operator. Number of vehicles 202 and operator 218 may move within the same spaces of augmented reality environment 204. It is desirable to reduce risks to operator 218 due to number of vehicles 202 within augmented reality environment 204. Operator 218 desirably is presented with information regarding movement of number of vehicles 202 or status of number of vehicles 202.

Operator 218 uses augmented reality device 220 to receive information regarding at least one of movement of number of vehicles 202 or status of number of vehicles 202. Operator 218 uses augmented reality device 220 to receive information regarding at least one of movement of number of vehicles 202 or status of number of vehicles 202 in the form of augmented reality information 224. In some illustrative examples, operator 218 uses augmented reality device 220 to visualize information regarding at least one of movement of number of vehicles 202 or status of number of vehicles 202.

Augmented reality device 220 takes the form of portable computing device 222. Augmented reality device 220 provides augmented reality information 224 in association with live view 226.

Portable computing device 222 is a physical hardware device that is used by operator 218 to receive augmented reality information 224 about number of vehicles 202 in augmented reality environment 204. Portable computing device 222 takes any desirable form of a suitable hardware system that can be moved and held or worn by operator 218. In some illustrative examples, portable computing device 222 is a physical hardware device that is used by operator 218 to visualize augmented reality information 224 about number of vehicles 202 in augmented reality environment 204. Portable computing device 222 can be selected from at least one of smart glasses 230, tablet 232, phone 234, laptop 236, a head mounted display, or some other suitable computing device that can be moved and held or worn by operator 218.

In this illustrative example, augmented reality system 200 enables operator 218 operating portable computing device 222 to visualize a live view 226 of augmented reality environment 204 by augmenting live view 226 with augmented reality information 224 related to at least one of movement or status of number of vehicles 202.

As depicted, augmented reality system 200 augments live view 226 of augmented reality environment 204. Live view 226 is a view of real-world augmented reality environment 204 seen through portable computing device 222. In some illustrative examples, live view 226 can be images or video generated by a camera in portable computing device 222 and displayed on display device 228 in portable computing device 222 in real-time. In other examples, live view 226 can be directly seen by operator 218 through portable computing device 222.

In some illustrative examples, live view 226 can be directly seen by operator 218 by using transparent, see-through displays or lenses, such that operator 218 is able to see the physical real-world environment, augmented reality environment 204 through the display in augmented reality device 220.

In some illustrative examples, portable computing device 222 takes the form of smart glasses 230 and live view 226 is directly seen by operator 218 through smart glasses 230. In some illustrative examples, portable computing device 222 takes the form of one of tablet 232, phone 234, or laptop 236 and live view 226 takes the form of images or video generated by a camera and displayed on display device 228.

Augmented reality information 224 presented by augmented reality device 220 includes indicators 238. Indicators 238 indicate information regarding at least one of number of vehicles 202, operator 218, or augmented reality device 220. In some illustrative examples, indicators 238 indicate information regarding number of vehicles 202. In some illustrative examples, at least one indicator of indicators 238 indicates information regarding a location of operator 218 within augmented reality environment 204. In some illustrative examples, at least one indicator of indicators 238 indicates information regarding a location of operator 218 relative to vehicle 208. In one illustrative example, at least one indicator of indicators 238 indicates operator 218 is blocking a path for vehicle 208. In some illustrative examples, at least one indicator of indicators 238 indicates information regarding a location of portable computing device 222 within augmented reality environment 204. In some illustrative examples, at least one indicator of indicators 238 indicates portable computing device 222 is within a keep out area of augmented reality environment 204.

Indicators 238 include at least one of visual indicator 240, auditory indicator 242, or haptic indicator 244. Visual indicator 240 is presented on live view 226 of augmented reality environment 204. In this example, augmented reality information 224 can be displayed on live view 226 to augment live view 226 of real-world augmented reality environment 204. Visual indicator 240 has any desirable form. When augmented reality information 224 comprises visual indicator 240, visual indicator 240 can include at least one of icon 246, text 248, object outline 250, shading 252, color 254, flashing 256, an image, a moving graphic, a video, or other suitable types of information that can be overlaid on live view 226 of augmented reality environment 204.

In some illustrative examples, indicators 238 includes auditory indicator 242. Auditory indicator 242 has any desirable form. When augmented reality information 224 comprises auditory indicator 242, auditory indicator 242 can include at least one of tone 258 or speech 260. Auditory indicator 242 is generated by speaker 262 of augmented reality device 220.

In some illustrative examples, auditory indicator 242 is generated as a real-time alert to operator 218. In some illustrative examples, auditory indicator 242 is generated to alert operator 218 to a location of operator 218 within augmented reality environment 204. In one illustrative example, auditory indicator 242 is generated to alert operator 218 that operator 218 has entered or is about to enter keep out area 295. In one illustrative example, auditory indicator 242 is generated to alert operator 218 that operator 218 is present within, has entered, or is about to enter movement area 297. In one illustrative example, auditory indicator 242 is generated to alert operator 218 that operator 218 has exited or is about to exit operator area 296. In some illustrative examples, auditory indicator 242 is generated to alert operator 218 to a location of operator 218 within augmented reality environment 204.

In some illustrative examples, auditory indicator 242 is generated to alert operator 218 to a location of operator 218 relative to at least one vehicle of number of vehicles 202. In some illustrative examples, auditory indicator 242 is generated to alert operator 218 that a vehicle, such as vehicle 208, is prohibited from movement by the location of operator 218. In some illustrative examples, auditory indicator 242 is generated to alert operator 218 that a vehicle, such as vehicle 208, within a prescribed distance of operator 218 is moving or about to move within augmented reality environment 204. In one illustrative example, the prescribed distance is selected such that operators affected by the movement are alerted. For example, when operator 218 is performing operations at a gate, auditory indicator 242 is generated to alert operator 218 that aircraft 210 at the gate is about to taxi.

In some illustrative examples, indicators 238 includes haptic indicator 244. Haptic indicator 244 has any desirable form. In some illustrative examples, haptic indicator 244 is vibration 264. Vibration 264 is generated by vibration actuators 266 of augmented reality device 220. In some illustrative examples, haptic indicator 244 is generated as a real-time alert to operator 218. In some illustrative examples, haptic indicator 244 is generated to alert operator 218 to a location of operator 218 within augmented reality environment 204. In one illustrative example, haptic indicator 244 is generated to alert operator 218 that operator 218 has entered or is about to enter keep out area 295. In one illustrative example, haptic indicator 244 is generated to alert operator 218 that operator 218 is present within, has entered, or is about to enter movement area 297. In one illustrative example, haptic indicator 244 is generated to alert operator 218 that operator 218 has exited or is about to exit operator area 296. In some illustrative examples, haptic indicator 244 is generated to alert operator 218 to a location of operator 218 within augmented reality environment 204.

In some illustrative examples, haptic indicator 244 is generated to alert operator 218 to a location of operator 218 relative to at least one vehicle of number of vehicles 202. In some illustrative examples, haptic indicator 244 is generated to alert operator 218 that a vehicle, such as vehicle 208, is prohibited from movement by the location of operator 218. In some illustrative examples, haptic indicator 244 is generated to alert operator 218 that a vehicle, such as vehicle 208, within a prescribed distance of operator 218 is moving or about to move within augmented reality environment 204. In one illustrative example, the prescribed distance is selected such that operators affected by the movement are alerted. For example, when operator 218 is performing operations at a gate, haptic indicator 244 is generated to alert operator 218 that aircraft 210 at the gate is about to taxi.

Communication signal 268 is sent out by vehicle 208. Data 269 from vehicle 208 is provided to augmented reality device 220 within communication signal 268. Communication signal 268 is a wireless communication signal sent from communication system 270 of vehicle 208 to communication system 272 of augmented reality device 220.

Communication system 272 of augmented reality device 220 is configured to receive data from number of vehicles 202. In some illustrative examples, communication system 272 is further configured to communicate with other devices in augmented reality system 200.

In some illustrative examples, computer system 271 communicates with communication system 272. In this illustrative example, computer system 271 is in communication with portable computing device 222. These components are in communication with each other using wireless communications links in these illustrative examples. As depicted, augmented reality system 200 comprises computer system 271 and portable computing device 222. Computer system 271 is a physical hardware system and includes one or more data processing systems. When more than one data processing system is present in computer system 271, those data processing systems are in communication with each other using a communications medium. The communications medium can be a network. The data processing systems can be selected from at least one of a computer, a server computer, a tablet computer, or some other suitable data processing system.

In some illustrative examples, computer system 271 provides additional information to communication system 272 for generation of augmented reality information 224 or positioning of augmented reality information 224 relative to live view 226. In some illustrative examples, computer system 271 provides environment model 284 to augmented reality device 220. In some illustrative examples, computer system 271 provides positional information of augmented reality device 220 within augmented reality environment 204 to supplement, verify, or replace location 288 determined by positioning system 289.

After receiving data 269 at communication system 272, data 269 is provided to processor 274 of augmented reality device 220. Data 269 is used by processor 274 to provide augmented reality information 224 comprising indicators 238 associated with at least one of movement of vehicle 208 or status of vehicle 208. Data 269 includes at least one of current position 276, objective 277, vector 211, current movement status 278, current power status 279, or vehicle type 280.

Current position 276 is a position of vehicle 208 within augmented reality environment 204. Objective 277 includes at least one of a desired location, a desired speed, or a desired time. In one illustrative example, vehicle 208 has objective 277 of an airstrip within airport 206 at a scheduled takeoff time.

Vector 211 is a vector of movement for vehicle 208. Vector 211 includes direction 213 and current speed 215. When provided, vector 211 provides for real-time updates to augmented reality information 224.

Current movement status 278 provides a state of vehicle 208. In some illustrative examples, current movement status 278 is selected from moving 281, inhibited from moving 282, or planned movement 283, or any other desirable movement status. In some illustrative examples, current movement status 278 may include parked, idling, or any other desirable status.

Moving 281 indicates that vehicle 208 is currently moving. Inhibited from moving 282 indicates that it is desirable for vehicle 208 to be moving, but an object, a person, another vehicle or another type of obstruction is inhibiting vehicle 208 from moving. Planned movement 283 indicates that vehicle 208 is not currently moving but has future movement planned. In some illustrative examples, planned movement 283 provides information regarding a time frame for the future movement.

Current power status 279 indicates whether vehicle 208 is powered up, in a low power state, or powered off. Vehicle type 280 indicates whether vehicle 208 is aircraft 210, towing vehicle 212, service vehicle 214, or any other desirable type of vehicle found within augmented reality environment 204.

Environment model 284 is a model of augmented reality environment 204. In one illustrative example, when augmented reality environment 204 takes the form of airport 206, environment model 284 includes any desirable features of airport 206, such as a terminal, a runway, a taxiway, a maintenance area, a hangar, or any other desirable area of airport 206. Environment model 284 takes any desirable form. In some illustrative examples, environment model 284 takes the form of two-dimensional map 285. In some illustrative examples, environment model 284 takes the form of three-dimensional map 286.

To present augmented reality information 224 associated with live view 226, it is desirable for processor 274 to have position data for number of vehicles 202 and portable computing device 222 in augmented reality environment 204. Current position 276 of vehicle 208 is present in data 269 sent to augmented reality device 220. In some illustrative examples, location 288 of augmented reality device 220 in augmented reality environment 204 is determined using positioning system 289 of augmented reality device 220.

Direction 290 augmented reality device 220 faces within augmented reality environment 204 affects live view 226. In some illustrative examples, direction 290 is determined by directional sensing unit 291 of augmented reality device 220.

Directional sensing unit 291 takes any desirable form. In some illustrative examples, directional sensing unit 291 comprises at least one of a magnetic compass, a directional antenna, an inertial sensor, or any other desirable type of direction sensing equipment. A directional antenna will sense direction of arrival of signals from fixed ground stations.

In some illustrative examples, each of number of vehicles and augmented reality device 220 include directional antenna designed such that the relative bearing between the two statements is known and one of the two stations also knows the bearing relative to a global coordinate system. For example, vehicle 208 may have a number of pieces of directional equipment to determine directional information in a world coordinate system, but augmented reality device 220 does not have directional equipment configured to determine directional information in the world coordinate system. In this example, directional sensing unit 291 comprises a directional antenna configured to determine bearing relative to vehicle 208. Communications occur between vehicle 208 and augmented reality device 220 such that the following pieces of data are combined: the world reference system bearing of vehicle 208 and the relative bearing between vehicle 208 and augmented reality device 220. In these illustrative examples, the world reference bearing of augmented reality device 220 can be determined so that field of view 293 can be determined.

In some illustrative examples, processor 274 determines field of view 293 of augmented reality device 220 using direction 290 measured by directional sensing unit 291 of augmented reality device 220. In some illustrative examples, processor 274 selects augmented reality information 224 to be presented based on field of view 293.

Processor 274 determines at least one of region 292, field of view 293, or path 294 using at least one of data 269, location 288, direction 290, or data from computer system 271. In some illustrative examples, processor 274 selects augmented reality information 224 to be displayed on live view 226 based on field of view 293.

Region 292 takes any desirable form. In some illustrative examples, region 292 takes the form of one of keep out area 295, operator area 296, or movement area 297. In some illustrative examples, region 292 is displayed over live view 226. In some illustrative examples, region 292 is presented using at least one of shading 252 or color 254. In some illustrative examples, region 292 is presented by an outline of region 292.

Keep out area 295 is one of a permanent area or a temporary area. Keep out area 295 is a region which operators should not enter. In some illustrative examples, keep out area 295 is set by augmented reality device 220 based on data from one of number of vehicles 202. In some illustrative examples, a vehicle of number of vehicles 202 sets keep out area 295 and sends data regarding keep out area 295 to augmented reality device 220 so that augmented reality device 220 can display keep out area 295. In some illustrative examples, keep out area 295 is determined by a system external to augmented reality device 220, such as computer system 271. In these illustrative examples, data regarding keep out area 295 is sent to augmented reality device 220 so that augmented reality device 220 can display keep out area 295.

Operator area 296 is a region in which operator 218 is to perform operations. In some illustrative examples, operator area 296 is an area which operator 218 is to stay within. In some illustrative examples, operator area 296 is a permanent area. In some illustrative examples, operator area 296 changes in at least one of position or size over time. In some illustrative examples, visual indicator 240 displays operator area 296 over live view 226. In some illustrative examples, at least one of auditory indicator 242 or haptic indicator 244 is presented when portable computing device 222 is outside of operator area 296 or about to exit operator area 296.

In some illustrative examples, movement area 297 is an area in which a vehicle is moving, or is scheduled to move. In some illustrative examples, movement area 297 is permanent. In some illustrative examples, movement area 297 is a roadway, taxiway, or other area for the movement of number of vehicles 202. In some illustrative examples, movement area 297 is temporary. In some illustrative examples, movement area 297 is determined from data sent by number of vehicles 202.

In some illustrative examples, processor 274 determines path 294 from data 269. Path 294 is a route for vehicle 208 within augmented reality environment 204. When path 294 is within field of view 293, path 294 is displayed as visual indicator 240 over live view 226.

Communication signal 268 is sent within augmented reality environment 204 in response to any desirable stimulus. In some illustrative examples, communication signal 268 is sent to augmented reality device 220 in response to a request from augmented reality device 220. In some illustrative examples, communication signal 268 is sent to augmented reality device 220 in response to augmented reality device 220 being a designated distance from vehicle 208. In some illustrative examples, communication signals are continuously sent from vehicle 208. In some illustrative examples, communication signal 268 takes the form of beacon 298. Beacon 298 occurs when vehicle 208 sends communication signals, including communication signal 268, at set time intervals.

Augmented reality information 224 generated using data 269 and environment model 284 provides information related to vehicle 208 to operator 218. Augmented reality information 224 presented to operator 218 provides information related to at least one of a movement or a status of vehicle 208 to operator 218.

In some illustrative examples, it is desirable for number of vehicles 202 to be aware of operator 218 within augmented reality environment 204. In some illustrative examples, it is desirable for vehicle 208 to be aware of a position of operator 218 in augmented reality environment 204.

In some illustrative examples, augmented reality device 220 is configured to send receipt signal 299 to each of number of vehicles 202 in response to receiving data 269 from number of vehicles 202. As depicted, augmented reality device 220 sends receipt signal 299 to communication system 270 of vehicle 208.

Number of vehicles 202 can use receipt signal 299 to track at least one of a presence of operator 218 in augmented reality environment 204, a location of operator 218 within augmented reality environment 204, or a quantity of operators within augmented reality environment 204. By receiving data 269, operator 218 is alerted to number of vehicles 202 in augmented reality environment 204. By receiving receipt signal 299, number of vehicles 202 is alerted to operator 218 in augmented reality environment 204.

Augmented reality system 200 is present within augmented reality environment 204. Augmented reality system 200 comprises number of vehicles 202 within augmented reality environment 204 and augmented reality device 220 configured to receive data 269 from number of vehicles 202 and present augmented reality information 224 in association with live view 226 of augmented reality environment 204 in augmented reality device 220 using data 269 from number of vehicles 202 and environment model 284. Augmented reality information 224 comprises indicators 238 associated with at least one of movement of number of vehicles 202 or status of number of vehicles 202. Number of vehicles 202 is configured to output data 269 comprising at least one of current position 276, objective 277, current movement status 278, vehicle type 280, or current power status 279.

Augmented reality device 220 is portable computing device 222 with display device 228 configured to display visual indicators, such as visual indicator 240, of augmented reality information 224. In some illustrative examples, portable computing device 222 comprises at least one of speaker 262 configured to produce auditory indicator 242 or vibration actuators 266 configured to produce haptic indicator 244.

As depicted, portable computing device 222 determines a location on live view 226 for visual indicator 240 using data 269 and environment model 284.

In one illustrative example, one or more technical solutions are present that overcome a technical problem with reducing risk to operators within an environment having moving vehicles. In one illustrative example, one or more technical solutions are present that overcome a technical problem with improving communication between operators and a number of vehicles within an environment.

In some of the illustrative examples, one or more technical solutions provide indicators related to at least one of movement or status of a number of vehicles using portable computing devices. In some of the illustrative examples, one or more technical solutions provide visualizations related to at least one of movement or status of a number of vehicles using portable computing devices. As a result, one or more technical solutions may provide a technical effect of providing notification of a movement or a status of vehicles with increased efficiency by using data from a number of vehicles directly to an augmented reality device as compared to currently used techniques.

Augmented reality device 220 can be configured to perform at least one of the steps, operations, or actions described in the different illustrative examples using software, hardware, firmware or a combination thereof. As a result, augmented reality device 220 operates as a special purpose computer system which presents augmented reality information 224 in association with live view 226 in a manner that provides an augmented reality display.

The illustration of augmented reality system 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although number of vehicles 202 is depicted as including only one vehicle, vehicle 208, number of vehicles 202 is any desirable quantity of vehicles. In other non-depicted illustrative examples, number of vehicles 202 has more than one vehicle. As another example, although indicators 238 is depicted with visual indicator 240, any desirable quantity of visual indicators is present in augmented reality information 224. As yet another example, auditory indicator 242 and haptic indicator 244 are optional. In some illustrative examples, indicators 238 include only visual indicators.

Figure 3:
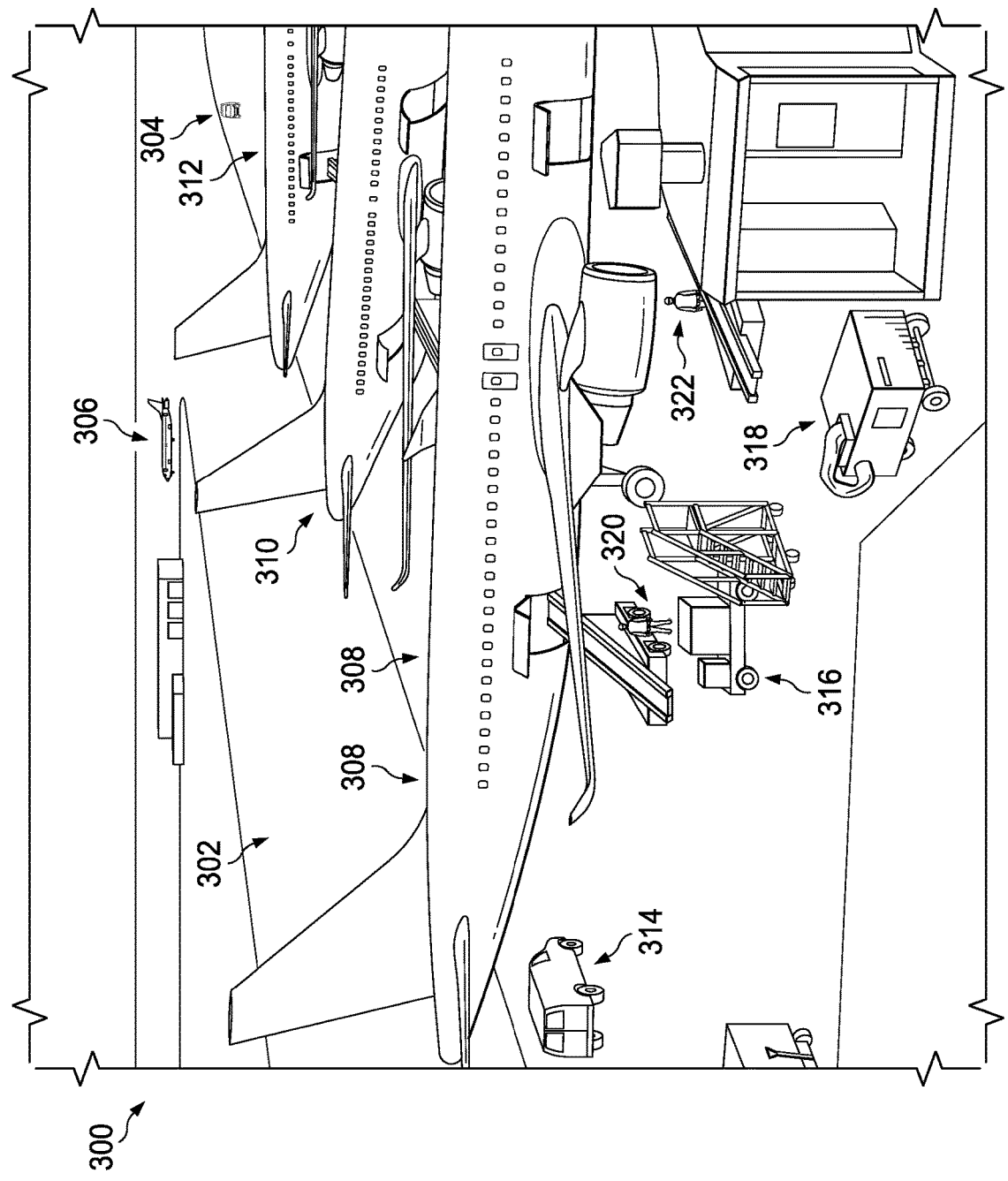
FIG. 3 is an illustration of an environment with a number of vehicles and operators moving within it in accordance with an illustrative embodiment.

Turning now to FIG. 3, an illustration of an environment with a number of vehicles and operators moving within it is depicted in accordance with an illustrative embodiment. In some illustrative examples, environment 300 is a physical implementation of environment 125 in FIG. 1. In some illustrative examples, environment 300 is a physical implementation of augmented reality environment 204 of FIG. 2. Environment 300 takes the form of airport 302. Airport 302 has augmented reality system 304 configured to visualize at least one of a movement of number of vehicles 306 or visualizing status of number of vehicles 306 within environment 300.

Number of vehicles 306 is a physical implementation of number of vehicles 126 of FIG. 1. Number of vehicles 306 includes aircraft 308, aircraft 310, aircraft 312, truck 314, luggage vehicle 316, and taxiing vehicle 318. Operator 320 and operator 322 are present within environment 300. Operator 320 and operator 322 are performing operations on aircraft 308 while aircraft 308 is parked.

For operator safety, it is desirable for operator 320 and operator 322 to be aware of any movements or intended movements of vehicles 306 within environment 300. Additionally, for operator safety, it is desirable for vehicles 306 to be aware of the presence of operator 320 and operator 322 within airport 302.

In some illustrative examples, operator 320 has an augmented reality device (not depicted) configured to present augmented reality information related to vehicles 306 in association with a live view of environment 300. In some illustrative examples, the augmented reality information takes the form of visual indicators displayed on the live view of environment 300. In some illustrative examples, the augmented reality information takes the form of auditory indicators or haptic indicators generated in association with the live view of environment 300.

In some illustrative examples, operator 322 has an augmented reality device (not depicted) configured to present augmented reality information related to vehicles 306 in association with a live view of environment 300. In some illustrative examples, the augmented reality information takes the form of visual indicators displayed on the live view of environment 300. In some illustrative examples, the augmented reality information takes the form of auditory indicators or haptic indicators generated in association with the live view of environment 300.

Figure 4:
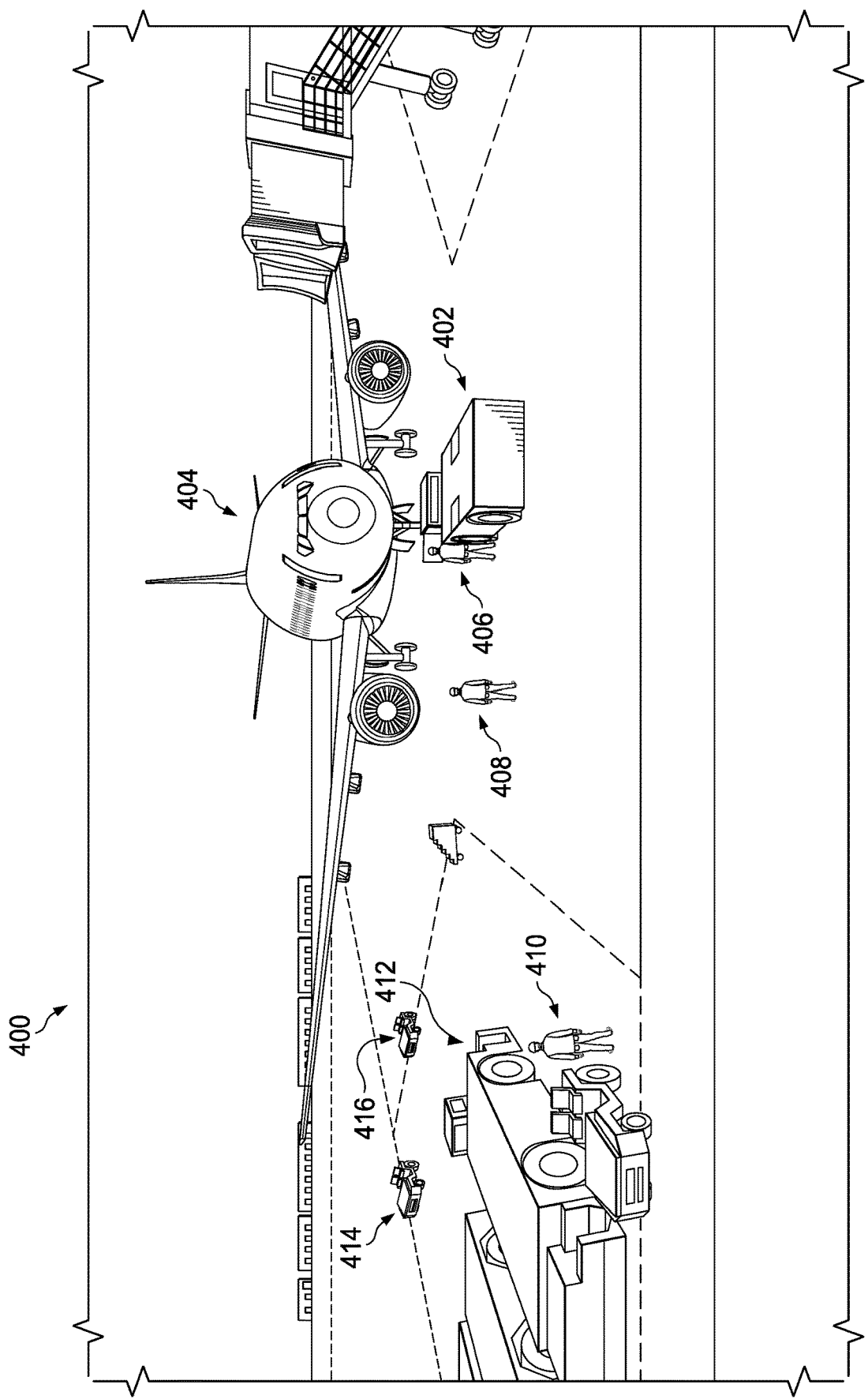
FIG. 4 is an illustration of an environment with a number of vehicles and operators moving within it in accordance with an illustrative embodiment.

Turning now to FIG. 4, an illustration of an environment with a number of vehicles and operators moving within it is depicted in accordance with an illustrative embodiment. In some illustrative examples, environment 400 is a physical implementation of environment 125 in FIG. 1. In some illustrative examples, environment 400 is a physical implementation of augmented reality environment 204 of FIG. 2. Environment 400 takes the form of an airport. Environment 400 is an environment in which an augmented reality system is desirably operated to indicate at least one of a movement of number of vehicles or a status of a number of vehicles within environment 400. In some illustrative examples, environment 400 is an environment in which an augmented reality system is desirably operated to visualize at least one of a movement of number of vehicles or a status of a number of vehicles within environment 400.

Towing vehicle 402 is towing aircraft 404 within environment 400. Operator 406 is tasked with connecting towing vehicle 402 to aircraft 404.

Operator 408 is standing in front of aircraft 404 and beside towing vehicle 402. For operator safety, it is desirable for operator 406 and operator 408 to be aware of any movements or intended movements of towing vehicle 402 and aircraft 404.

Operator 410 is standing away from aircraft 404 and near vehicles 412. Vehicles 412 include parked towing vehicles. Vehicle 414 and vehicle 416 are operator transportation vehicles.

In some illustrative examples, operator 406 has an augmented reality device configured to present augmented reality information related to at least one of towing vehicle 402, aircraft 404, or vehicles 412 over a live view of environment 400. In some illustrative examples, operator 408 has an augmented reality device configured to present augmented reality information related to at least one of towing vehicle 402, aircraft 404, or vehicles 412 over a live view of environment 400. In one illustrative example, aircraft 404 sends data including a current movement status inhibited from moving to an augmented reality device of operator 408. In this illustrative example, operator 408 is provided with augmented reality information indicating that aircraft 404 is inhibited from moving due to presence of operator 408. In some illustrative examples, operator 410 has an augmented reality device configured to present augmented reality information related to at least one of towing vehicle 402, aircraft 404, or vehicles 412 over a live view of environment 400.

Figure 5:
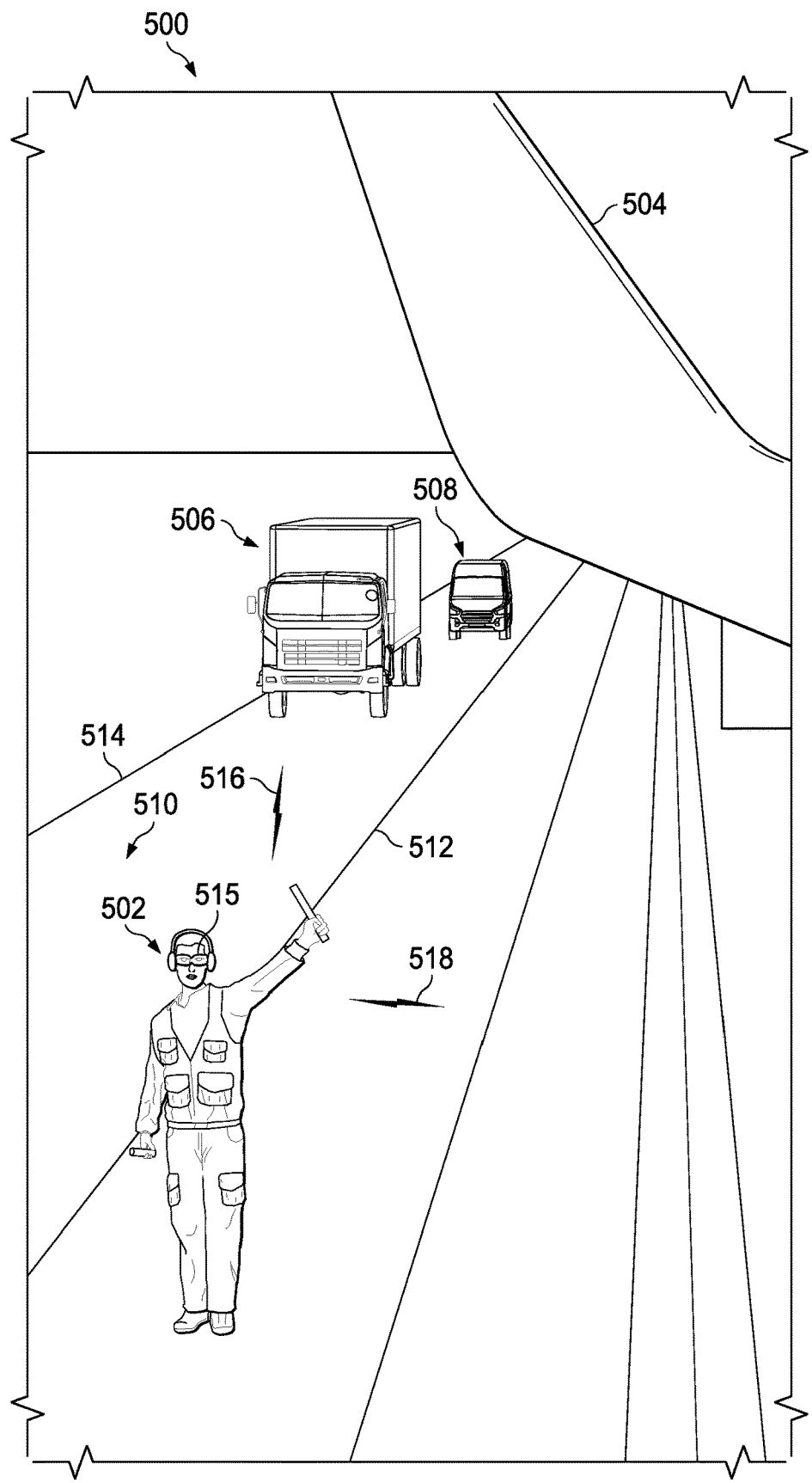
FIG. 5 is an illustration of an augmented reality environment in accordance with an illustrative embodiment.

Turning now to FIG. 5, an illustration of an augmented reality environment is depicted in accordance with an illustrative embodiment. In some illustrative examples, environment 500 is a physical implementation of environment 125 in FIG. 1. In some illustrative examples, environment 500 is a physical implementation of augmented reality environment 204 of FIG. 2. In environment 500, operator 502 is positioned alongside aircraft 504. In some illustrative examples, operator 502 is directing taxiing of aircraft 504. Cargo truck 506 and passenger truck 508 are also present in environment 500. Cargo truck 506 and passenger truck 508 are driving along road 510.

The back of operator 502 is turned to cargo truck 506 and passenger truck 508. Operator 502 is unable to see cargo truck 506 and passenger truck 508. In some illustrative examples, due to at least one of ambient noise or hearing protection for operator 502, operator 502 does not hear cargo truck 506 or passenger truck 508.

Cargo truck 506 and passenger truck 508 are traveling on road 510. Road 510 has a first edge and a second edge bordering road 510. Line 512 represents the first edge. Line 514 represents the second edge.

Operator 502 is using augmented reality device 515 within environment 500. Augmented reality device 515 presents augmented reality information in association with a live view of environment 500.

In some illustrative examples, visual indicators are presented over a live view of line 512 and line 514 of environment 500 on augmented reality device 515. In some illustrative examples, additional lines are presented as visual indicators over line 512 and line 514 on augmented reality device 515. In some illustrative examples, a shaded region is displayed between line 512 and line 514 over a live view of environment 500 on augmented reality device 515 when vehicles are moving along road 510.

In some illustrative examples, augmented reality device 515 displays line 512 and line 514 over a live view of environment 300 to indicate a keep out area. In these illustrative examples, the keep out area is road 510. In some illustrative examples, augmented reality device 515 displays line 512 and line 514 over a live view of environment 500 to indicate a movement area.

As depicted, cargo truck 506 sends data 516 to augmented reality device 515. Data 516 comprises at least one of a current position, an objective, a current movement status, a vehicle type, or a current power status.

In some illustrative examples, upon receiving data 516, augmented reality device 515 generates augmented reality information regarding cargo truck 506. In some illustrative examples, upon receiving data 516, augmented reality device 515 displays at least one visual indicator associated with at least one of line 512 or line 514 over a live view of environment 500 to indicate a movement area for cargo truck 506.

As depicted, aircraft 504 sends data 518 to augmented reality device 515. Data 518 comprises at least one of a current position, an objective, a current movement status, a vehicle type, or a current power status. Augmented reality device 515 displays augmented reality information based on the data. In some illustrative examples, upon receiving data 518, augmented reality device 515 generates augmented reality information regarding aircraft 504. In some illustrative examples, upon receiving data 518, augmented reality device 515 displays at least one visual indicator associated with at least one of movement or status of aircraft 504.

The augmented reality information displayed to operator 502 on augmented reality device 515 comprises any desirable type of visual indicator to display information related to at least one of movement or status of vehicles within environment 500.

Figure 6:
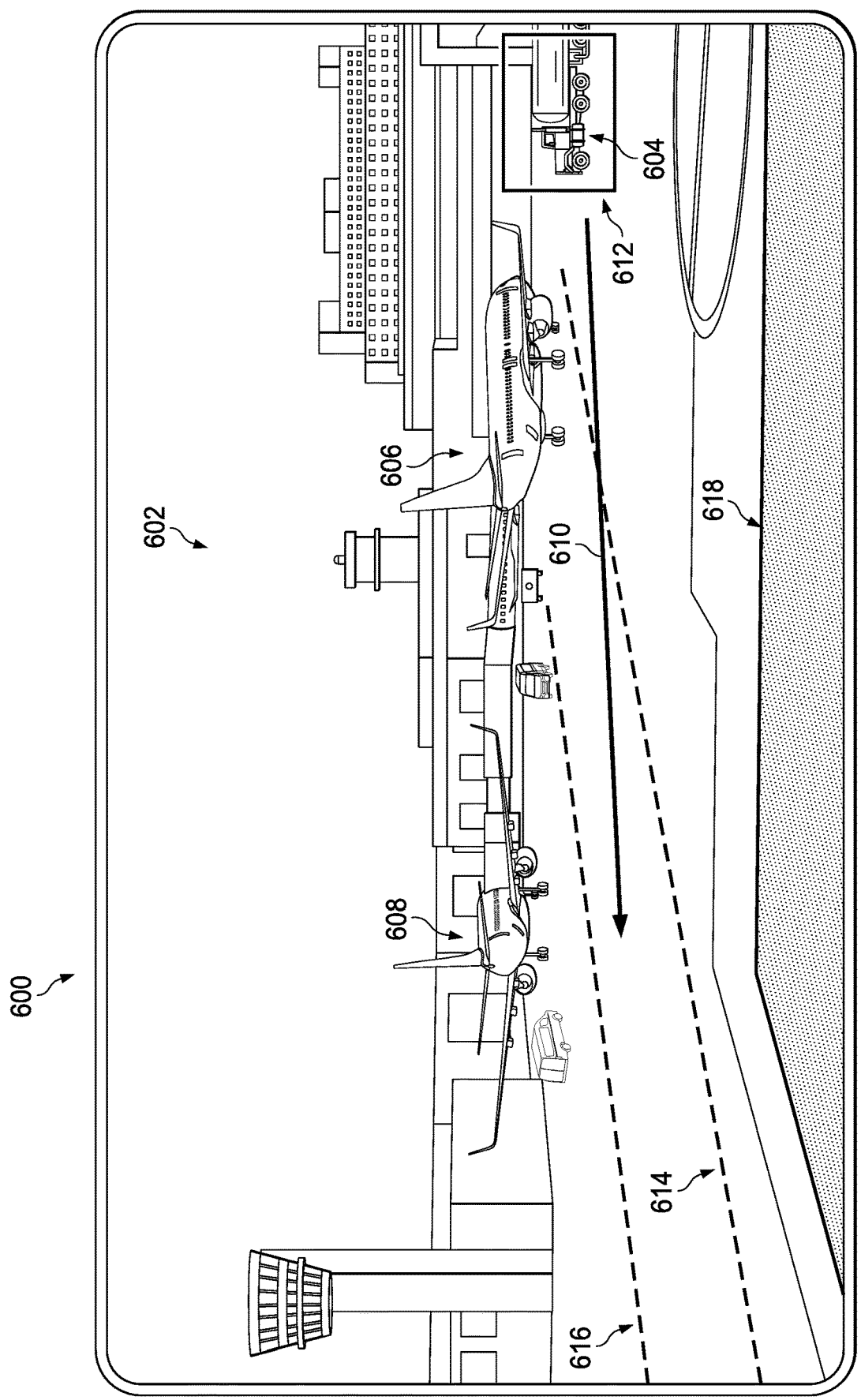
FIG. 6 is an illustration of augmented reality information on a live view of an augmented reality environment in accordance with an illustrative embodiment.

Turning now to FIG. 6, an illustration of augmented reality information on a live view of an augmented reality environment is depicted in accordance with an illustrative embodiment. Live view 600 is displayed on any desirable type of portable computing device, such as smart glasses 230, tablet 232, phone 234, or laptop 236 of FIG. 2. In some illustrative examples, live view 600 is an implementation of a live view of environment 125 on smart glasses 122 of FIG. 1. Live view 600 is an implementation of live view 226 of FIG. 2. In some illustrative examples, augmented reality device 220 of FIG. 2 displays live view 600 with augmented reality information 602.

Tanker 604, aircraft 606, and aircraft 608 are visible in live view 600. Data received from tanker 604, aircraft 606, and aircraft 608 is used to generate augmented reality information 602. Augmented reality information 602 includes indicators of at least one of movement or status of at least one of tanker 604, aircraft 606, or aircraft 608.

Augmented reality information 602 comprises a plurality of visual indicators. As depicted, augmented reality information 602 includes path 610. Path 610 represents planned movement of tanker 604. Path 610 is depicted as an arrow indicating a direction of movement of tanker 604. Path 610 is a non-limiting example of a depiction of a path. Characteristics of path 610, including color, thickness, length, and whether path 610 is persistent or flashing may be selected as desired.

As depicted, augmented reality information 602 includes object outline 612. Object outline 612 takes the form of a box. In other non-depicted illustrative examples, an object outline more closely follows the edges of an object, such as tanker 604. Object outline 612 has any desirable characteristics, such as color, line thickness, and whether object outline 612 is persistent or flashing. In some illustrative examples, object outline 612 is maintained over tanker 604 as tanker 604 moves within live view 600. In some illustrative examples, characteristics of object outline 612 are selected based on a speed of tanker 604, a distance of tanker 604 from the operator, or any other desirable aspects of movement or status of tanker 604.

Augmented reality information 602 includes dashed line 614 and dashed line 616 that border a movement area of aircraft 606. Dashed line 614 and dashed line 616 provide an area through which aircraft 606 has moved during taxiing.

Augmented reality information 602 includes operator area 618. Operator area 618 is indicated by a region of shading. Operator area 618 is an area in which an operator using the portable computing device with live view 600 and augmented reality information 602 performs operations. In some illustrative examples, operator area 618 is an area through which vehicles will not travel. In some illustrative examples, additional indicators will be provided if the operator using the portable computing device with live view 600 and augmented reality information 602 leaves or attempts to leave operator area 618. In some illustrative examples, an auditory indicator or a haptic indicator is generated when the operator using the portable computing device with live view 600 and augmented reality information 602 leaves or attempts to leave operator area 618.

FIG. 6 is a non-limiting example of a live view with augmented reality information. FIG. 6 is an example of a static image of live view 600 displayed on an augmented reality device. Live view 600 changes in real time. Augmented reality information 602 changes with time. In some illustrative examples, augmented reality information 602 changes as a function of time based on data provided by at least one of tanker 604, aircraft 606, or aircraft 608. In some illustrative examples, augmented reality information 602 changes in response to receiving updated data from at least one of tanker 604, aircraft 606, or aircraft 608.

Augmented reality information 602 is a non-limiting implementation of augmented reality information 224 of FIG. 2. In other non-depicted examples, augmented reality information 602 can include at least one of icons or text. In addition to the visual indicators depicted in augmented reality information 602, in some illustrative examples, augmented reality information 602 also includes at least one of auditory indicators or haptic indicators.

Figure 7:
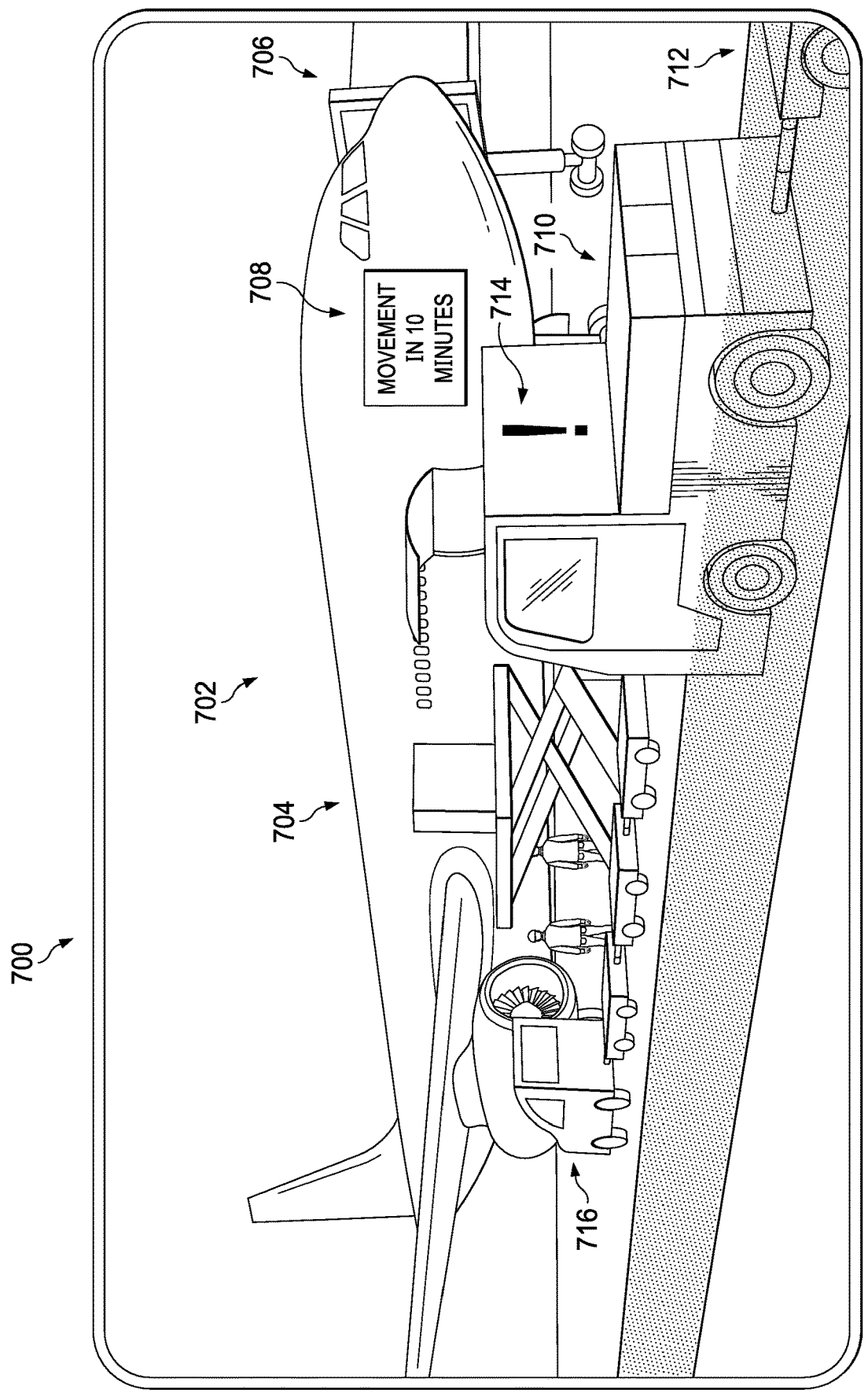
FIG. 7 is an illustration of augmented reality information on a live view of an augmented reality environment in accordance with an illustrative embodiment.

Turning now to FIG. 7, an illustration of augmented reality information on a live view of an augmented reality environment is depicted in accordance with an illustrative embodiment. Live view 700 is displayed on any desirable type of portable computing device, such as smart glasses 230, tablet 232, phone 234, or laptop 236 of FIG. 2. In some illustrative examples, live view 700 is an implementation of a live view of environment 125 on smart glasses 122 of FIG. 1. Live view 700 is an implementation of live view 226 of FIG. 2. In some illustrative examples, augmented reality device 220 of FIG. 2 displays live view 700 with augmented reality information 702.

Aircraft 704 is present within airport 706. Augmented reality information 702 includes indicator 708. Indicator 708 includes a box with text. Indicator 708 provides a status for aircraft 704. Indicator 708 includes an expected time for movement of aircraft 704.

Towing vehicle 710 is present within airport 706. Augmented reality information 702 includes indicator 712 and indicator 714. Indicator 712 is a shaded region indicating a movement area for towing vehicle 710. The movement area is an area through which towing vehicle 710 will move within airport 706.

Luggage vehicle 716 is present within airport 706. No augmented reality information is associated with luggage vehicle 716 in FIG. 7. In one illustrative example, luggage vehicle 716 is stationary. In one illustrative example, luggage vehicle 716 may not have communicated data to the augmented reality device. In one illustrative example, luggage vehicle 716 may not have a current status or a movement status that warrants augmented reality information in FIG. 7.

Figure 8A:
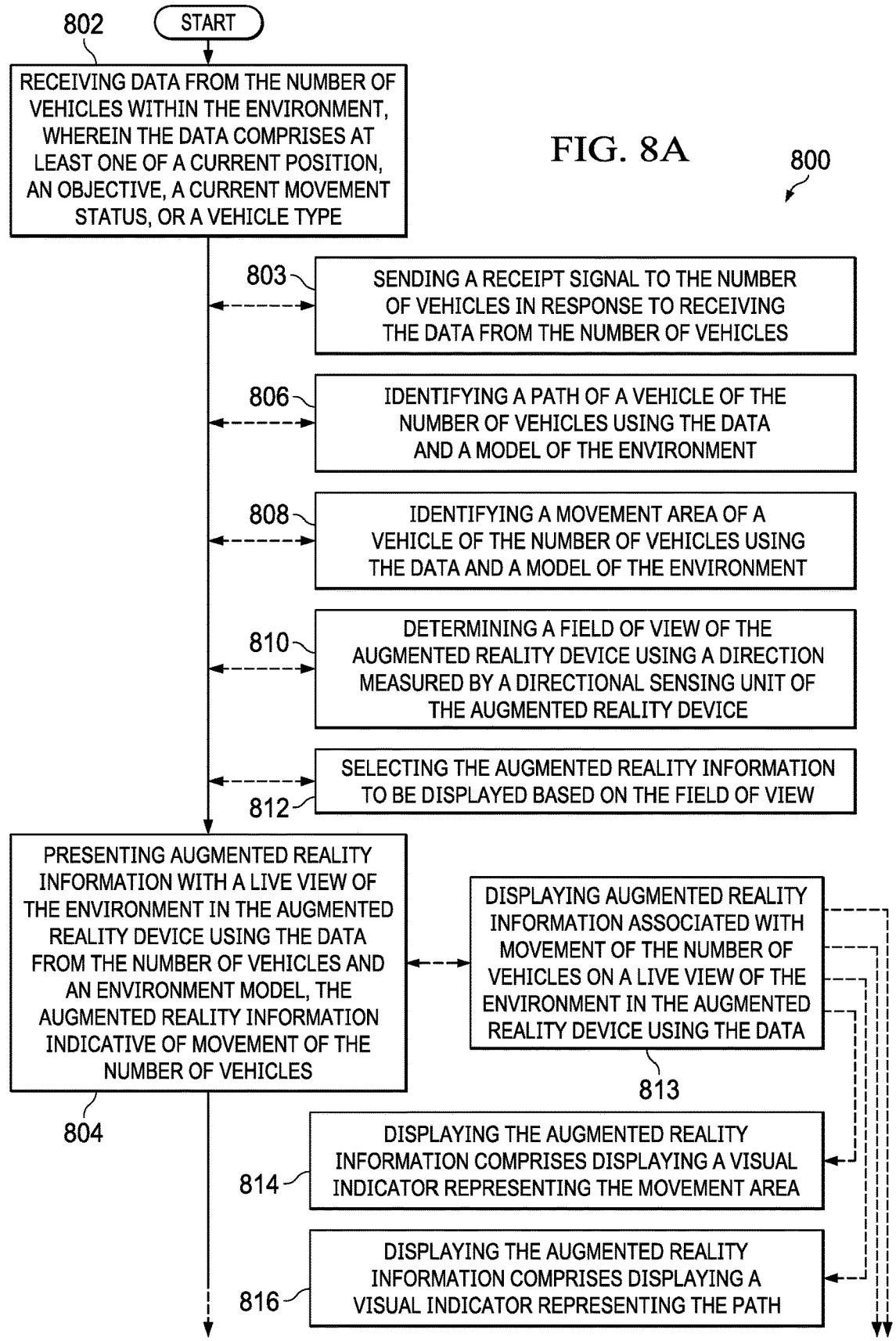

Turning now to FIGS. 8A and 8B, an illustration of a flowchart of a method for indicating movement of a number of vehicles within an environment is depicted in accordance with an illustrative embodiment. In some illustrative examples, method 800 is performed in network data processing system 100 and environment 125 of FIG. 1. In some illustrative examples, method 800 is performed using augmented reality system 200 in augmented reality environment 204 of FIG. 2. In some illustrative examples, method 800 is performed in environment 300 of FIG. 3. In some illustrative examples, method 800 is performed in environment 400 of FIG. 4. In some illustrative examples, method 800 is performed in environment 500 of FIG. 5. In some illustrative examples, live view 600 with augmented reality information 602 of FIG. 6 is displayed using method 800. In some illustrative examples, live view 600 with augmented reality information 702 of FIG. 7 is displayed using method 800.

Method 800 receives data from the number of vehicles within the environment, wherein the data comprises at least one of a current position, an objective, a current movement status, or a vehicle type (operation 802). Method 800 presents augmented reality information in association with a live view of the environment in the augmented reality device using the data from the number of vehicles and an environment model, the augmented reality information indicative of movement of the number of vehicles (operation 804). Afterwards, method 800 terminates.

Presenting the augmented reality information includes presenting indicators. The indicators take any desirable form. In some illustrative examples, indicators include at least one of a visual indicator, an auditory indicator, or a haptic indicator. In some illustrative examples, presenting the augmented reality information includes displaying augmented reality information associated with movement of the number of vehicles on a live view of the environment in the augmented reality device using the data. (operation 813).

In some illustrative examples, it is desirable for the vehicle to be aware of the presence of the operator in the environment. In some illustrative examples, method 800 sends a receipt signal to the number of vehicles in response to receiving the data from the number of vehicles (operation 803). The receipt signal indicates to the number of vehicles that an augmented reality device received the data. In some illustrative examples, the receipt signal also indicates that a human operator is within the environment. In some illustrative examples, the receipt signal includes a location of the augmented reality device within the environment. In some illustrative examples, at least one of the number of vehicles uses the location of the augmented reality device to monitor locations of human operators within the environment.

In some illustrative examples, method 800 identifies a path of a vehicle of the number of vehicles using the data and a model of the environment (operation 806). In some illustrative examples, displaying the augmented reality information comprises displaying a visual indicator representing the path (operation 816).

In some illustrative examples, method 800 identifies a movement area of a vehicle of the number of vehicles using the data and a model of the environment (operation 808). In some illustrative examples, displaying the augmented reality information comprises displaying a visual indicator representing the movement area (operation 814).

In some illustrative examples, method 800 determines a field of view of the augmented reality device using a direction measured by a directional sensing unit of the augmented reality device (operation 810). In some illustrative examples, method 800 selects the augmented reality information to be displayed based on the field of view (operation 812).

In some illustrative examples, displaying the augmented reality information comprises displaying at least one of text or an icon over a vehicle of the number of vehicles (operation 817). In some illustrative examples, the at least one of text or the icon is representative of a current movement status of the vehicle or a current power status of the vehicle.

In some illustrative examples, displaying the augmented reality information comprises displaying a keep out area on the live view of the environment (operation 818). In some illustrative examples, a keep out area is a permanent area that operators are not to enter. In some illustrative examples, a keep out area is a temporary area that operators are not to enter based on conditions within the environment.

In some illustrative examples, method 800 monitors a location of the augmented reality device within the environment (operation 820). In some illustrative examples, method 800 generates at least one of an auditory indicator or a haptic indicator in response to the augmented reality device at least one of moving into or approaching a keep out area or a movement area for a vehicle of the number of vehicles (operation 822).

In some illustrative examples, method 800 receives updated data from at least one vehicle of the number of vehicles within the environment, wherein the updated data comprises at least one of a current position, an objective, a current movement status, a vehicle type, or a current power status (operation 824). In some illustrative examples, method 800 displays updated augmented reality information associated with movement of the number of vehicles on a live view of the environment in the augmented reality device using the updated data (operation 826). In some illustrative examples, presenting augmented reality information in association with a live view of the environment in the augmented reality device using the data from the number of vehicles and an environment model comprises generating at least one of an auditory indicator or a haptic indicator indicative of movement of the number of vehicles (operation 828).

Figure 9:
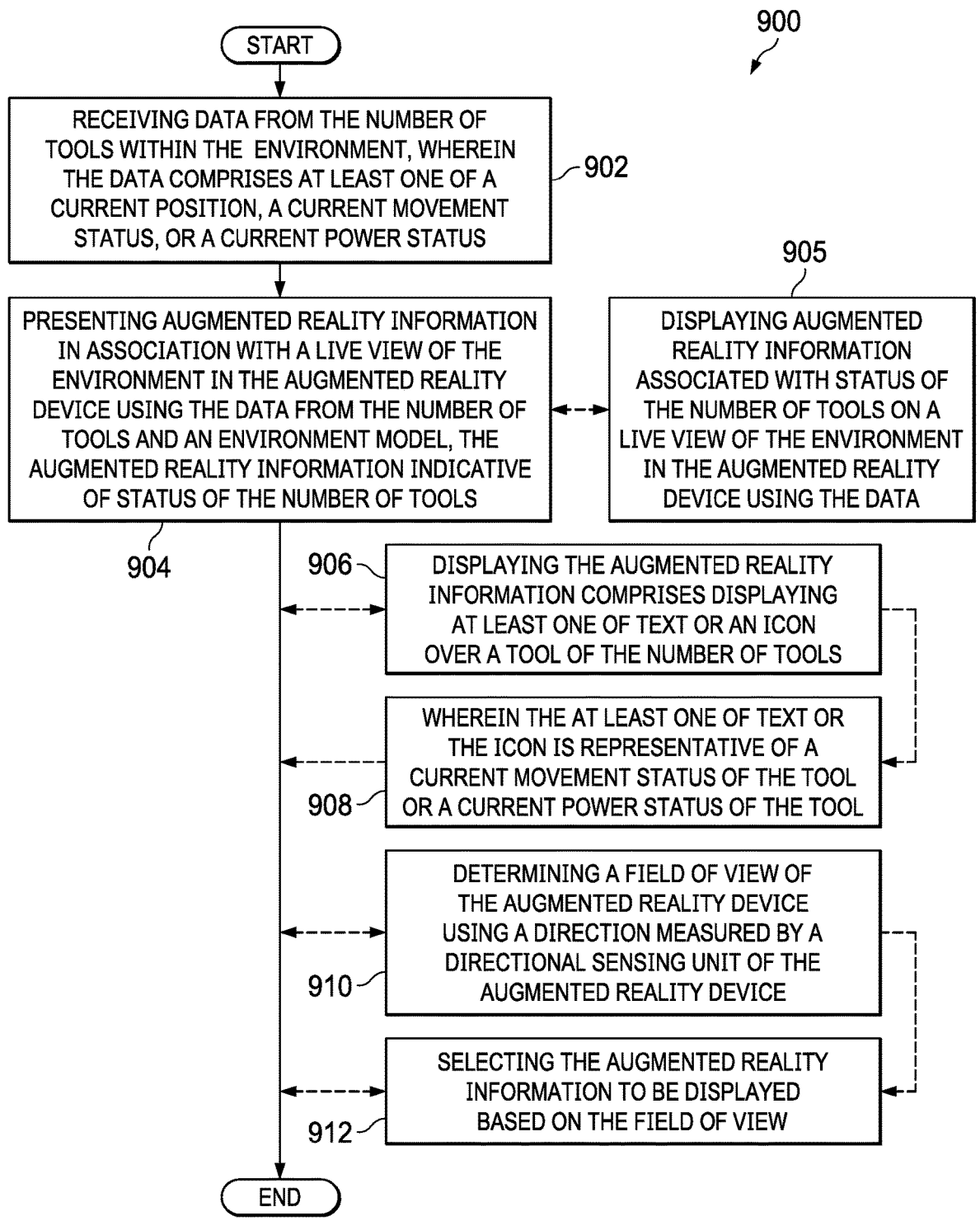
FIG. 9 is an illustration of a flowchart of a method for indicating status of vehicles within an environment in accordance with an illustrative embodiment.

Turning now to FIG. 9, an illustration of a flowchart of a method for indicating status of vehicles within an environment is depicted in accordance with an illustrative embodiment. In some illustrative examples, method 900 is performed in network data processing system 100 and environment 125 of FIG. 1. In some illustrative examples, method 900 is performed using augmented reality system 200 in augmented reality environment 204 of FIG. 2. In some illustrative examples, method 900 is performed in environment 300 of FIG. 3. In some illustrative examples, method 900 is performed in environment 400 of FIG. 4. In some illustrative examples, method 900 is performed in environment 500 of FIG. 5. In some illustrative examples, live view 600 with augmented reality information 602 of FIG. 6 is displayed using method 900. In some illustrative examples, live view 600 with augmented reality information 702 of FIG. 7 is displayed using method 900.

Method 900 receives data from the number of tools within the environment, wherein the data comprises at least one of a current position, a current movement status, or a current power status (operation 902). In some illustrative examples, the number of tools take the form of a number of vehicles. Method 900 presents augmented reality information in association with a live view of the environment in the augmented reality device using the data from the number of tools and an environment model, the augmented reality information indicative of status of the number of tools (operation 904). Afterwards, method 900 terminates.

In some illustrative examples, presenting augmented reality information in association with a live view of the environment in the augmented reality device using the data from the number of tools and an environment model comprises displaying augmented reality information associated with status of the number of tools on a live view of the environment in the augmented reality device using the data (operation 905). In some illustrative examples, displaying the augmented reality information comprises displaying at least one of text or an icon over a tool of the number of tools (operation 906). In some illustrative examples, the tool of the number of tools is a vehicle of a number of vehicles. In some illustrative examples, the at least one of text or the icon is representative of a current movement status of the tool or a current power status of the tool (operation 908).

In some illustrative examples, method determines a field of view of the augmented reality device using a direction measured by a directional sensing unit of the augmented reality device (operation 910). In some illustrative examples, method selects the augmented reality information to be presented based on the field of view (operation 912).

The processes in FIG. 8A, FIG. 8B and FIG. 9 can be implemented in hardware, software, or both. When implemented in software, the process can take the form of program code that is run by one of more processor units located in one or more hardware devices in one or more computer systems. For example, the process can be implemented in at least one of a processor in smart glasses 122 in FIG. 1 or processor 274 in augmented reality device 220 in FIG. 2.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 803 and operations 806 through operation 828 may be optional. As another example, operation 906 thorough operation 912 may be optional.

Figure 10:
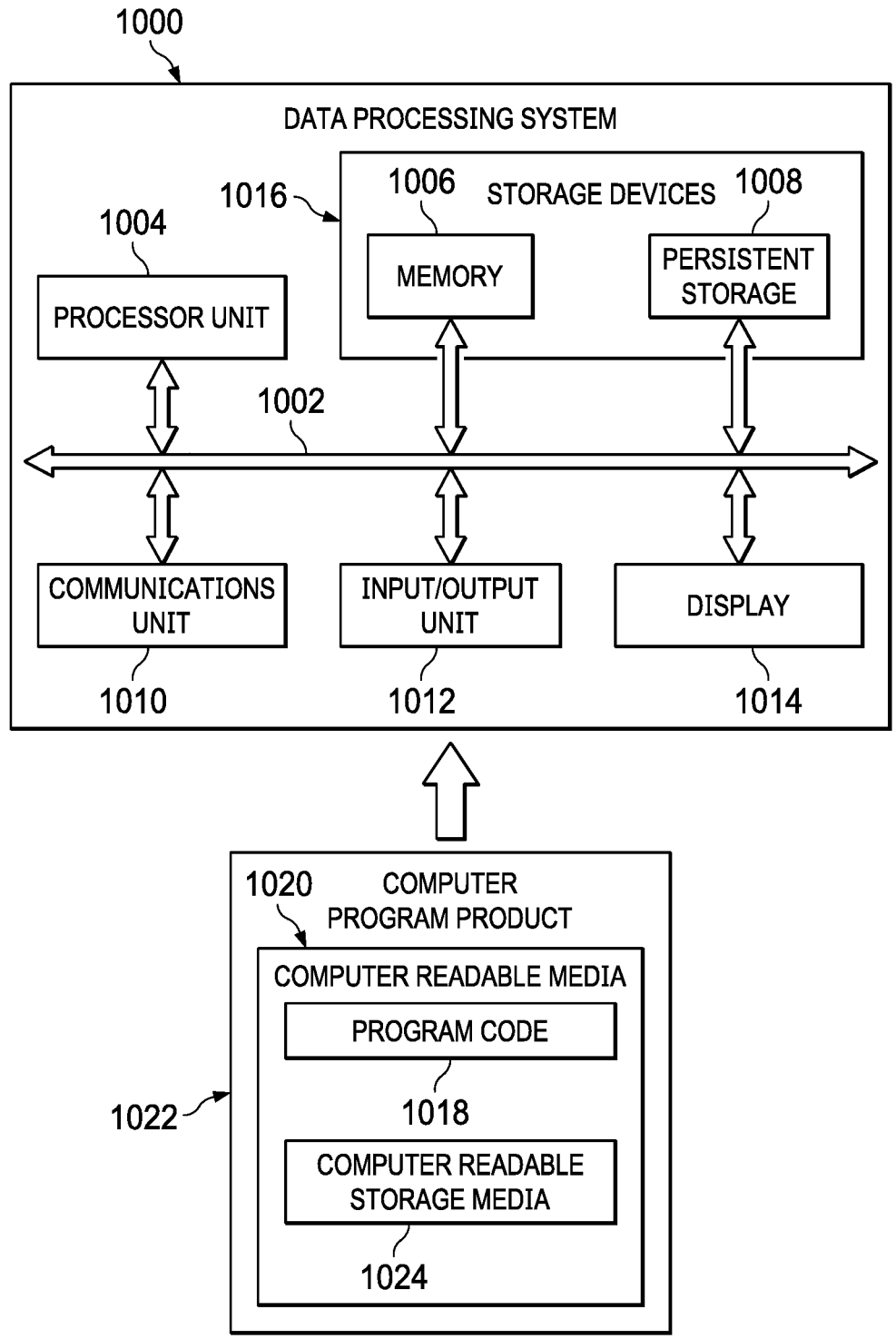
FIG. 10 is an illustration of a block diagram of a data processing system in accordance with an illustrative embodiment.

Turning now to FIG. 10, an illustration of a block diagram of a data processing system is depicted in accordance with an illustrative embodiment. Data processing system 1000 can be used to implement server computer 104, server computer 106, client devices 110, in FIG. 1. Data processing system 1000 is an example of one manner in which a portable computing device, such as smart glasses 122 of FIG. 1, portable computing device 222 of FIG. 2, or augmented reality device 515 of FIG. 5 can be implemented.

Data processing system 1000 can also be used to implement computer system 271 in FIG. 2. In this illustrative example, data processing system 1000 includes communications framework 1002, which provides communications between processor unit 1004, memory 1006, persistent storage 1008, communications unit 1010, input/output (I/O) unit 1012, and display 1014. In this example, communications framework 1002 takes the form of a bus system.

Processor unit 1004 serves to execute instructions for software that can be loaded into memory 1006. Processor unit 1004 include one or more processors. For example, processor unit 1004 can be selected from at least one of a multicore processor, a central processing unit (CPU), a graphics processing unit (GPU), a physics processing unit (PPU), a digital signal processor (DSP), a network processor, or some other suitable type of processor.

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, can be, for example, a random-access memory or any other suitable volatile or non-volatile storage device. Memory 1006 is connected to processor unit 1004 through communications framework 1002. As depicted, memory 1006 can include at least one of a random-access memory (RAM), a read-only memory (ROM), a static random-access memory (SRAM), a dynamic random-access memory (DRAM), or other suitable types of memory devices or circuits. Persistent storage 1008 may take various forms, depending on the particular implementation.

For example, persistent storage 1008 may contain one or more components or devices. For example, persistent storage 1008 can be a hard drive, a solid-state drive (SSD), a flash memory, a rewritable optical disk, a rewritable magnetic tape, or some combination of the above. The media used by persistent storage 1008 also can be removable. For example, a removable hard drive can be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that can be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs can be located in storage devices 1016, which are in communication with processor unit 1004 through communications framework 1002. The processes of the different embodiments can be performed by processor unit 1004 using computer-implemented instructions, which may be located in a memory, such as memory 1006.

Instructions in program code can be loaded from persistent storage 1008 into memory 1006 for processing by processor unit 1004. For example, the instructions in program code can include an augmented reality application for presenting augmented reality information in association with a live view of an environment.

Persistent storage 1008 can comprise at least one of a hard disk drive, a flash drive, a solid-state disk drive, an optical drive, or some other suitable type of data storage device or system. Persistent storage 1008 can store a map of an environment, a model of the environment, or other suitable information for use in a presentation of augmented reality information associated a live view of an environment.

These instructions are referred to as program code, computer usable program code, or computer-readable program code that can be read and executed by a processor in processor unit 1004. The program code in the different embodiments can be embodied on different physical or computer-readable storage media, such as memory 1006 or persistent storage 1008.

Program code 1018 is located in a functional form on computer-readable media 1020 that is selectively removable and can be loaded onto or transferred to data processing system 1000 for execution by processor unit 1004. Program code 1018 and computer-readable media 1020 form computer program product 1022 in these illustrative examples. In this illustrative example, computer-readable media 1020 is computer-readable storage media 1024.

In these illustrative examples, computer-readable storage media 1024 is a physical or tangible storage device used to store program code 1018 rather than a medium that propagates or transmits program code 1018.

Alternatively, program code 1018 can be transferred to data processing system 1000 using a computer-readable signal media. The computer-readable signal media can be, for example, a propagated data signal containing program code 1018. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1000 are not meant to provide architectural limitations to the manner in which different embodiments can be implemented. In some illustrative examples, one or more of the components may be incorporated in or otherwise form a portion of another component. For example, the 1006, or portions thereof, may be incorporated in processor unit 1004 in some illustrative examples. The different illustrative embodiments can be implemented in a data processing system including components in addition to or in place of those illustrated for data processing system 1000. Other components shown in FIG. 10 can be varied from the illustrative examples shown. The different embodiments can be implemented using any hardware device or system capable of running program code 1018.

The illustration of data processing system 1000 is an example of one manner in which portable computing device 222 can be implemented. This illustration is not meant to limit the manner in which data processing system 1000 or portable computing device 222 can be embodied in other illustrative examples. For example, data processing system 1000 can also include an audio interface in which an audio output device generates sound.

Figure 11:
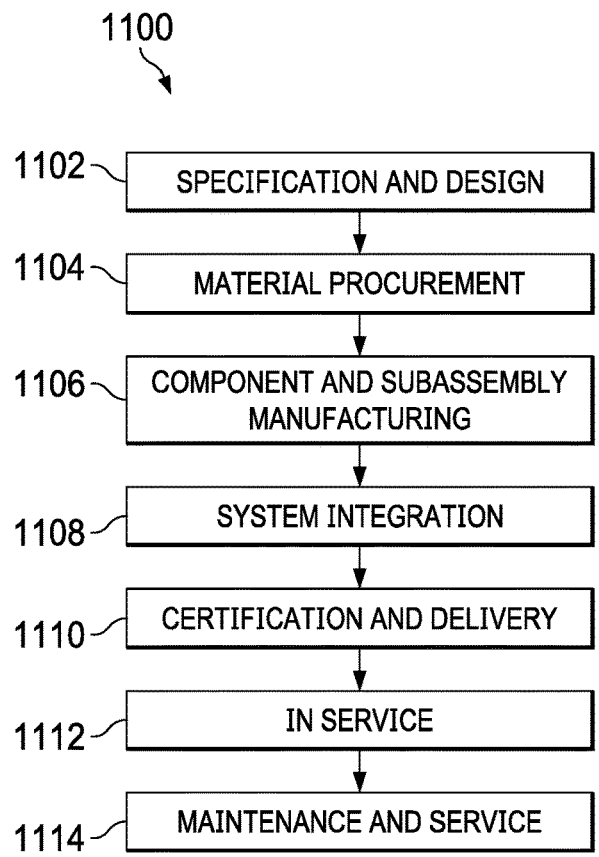
FIG. 11 is an illustration of a block diagram of an aircraft manufacturing and service method in accordance with an illustrative embodiment.
Figure 12:
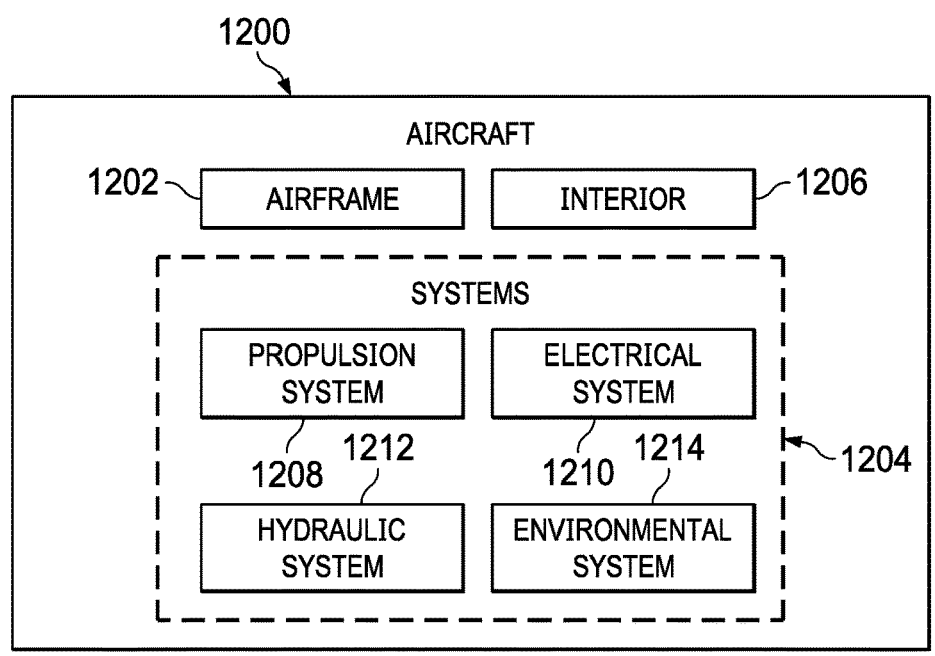
FIG. 12 is an illustration of a block diagram of an aircraft in which an illustrative embodiment may be implemented.

Illustrative embodiments of the disclosure may be described in the context of aircraft manufacturing and service method 1100 as shown in FIG. 11 and aircraft 1200 as shown in FIG. 12. Turning first to FIG. 11, an illustration of an aircraft manufacturing and service method is depicted in accordance with an illustrative embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 in FIG. 12 takes place. Thereafter, aircraft 1200 in FIG. 12 may go through certification and delivery 1110 in order to be placed in service 1112. While in service 1112 by a customer, aircraft 1200 in FIG. 12 is scheduled for routine maintenance and service 1114, which may include modification, reconfiguration, refurbishment, and other maintenance or service.

Each of the processes of aircraft manufacturing and service method 1100 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of an aircraft is depicted in which an illustrative embodiment may be implemented. In this example, aircraft 1200 is produced by aircraft manufacturing and service method 1100 in FIG. 11 and may include airframe 1202 with plurality of systems 1204 and interior 1206. Examples of systems 1204 include one or more of propulsion system 1208, electrical system 1210, hydraulic system 1212, and environmental system 1214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1100 in FIG. 11. In one illustrative example, a communication device of aircraft 1200 produced in component and subassembly manufacturing 1106 in FIG. 11 may be a part of an augmented reality system 200 of FIG. 2. A communication device of aircraft 1200 communicates with augmented reality device 220 of FIG. 2. Aircraft 1200 communicates with augmented reality device 220 of FIG. 2 while aircraft 1200 is in service 1112 in FIG. 11. As yet another example, one or more apparatus embodiments, method embodiments, or a combination thereof may be utilized during method stages, such as in service 1112 in FIG. 11. One or more apparatus embodiments, method embodiments, or a combination thereof may be utilized while aircraft 1200 is in service 1112, during maintenance and service 1114 in FIG. 11, or both.

For example, augmented reality system 200 can be used to provide visualizations of at least one of movement or status of aircraft 1200. These visualizations can include displaying an icon, text, an outline, a path, or a region. Augmented reality system 200 can be utilized by human operators during at least one of certification and delivery 1110, in service 1112, or maintenance and service 1114.

Thus, the illustrative embodiments provide a method, apparatus, and system for indicating movement or status of a number of tools in an environment. In some illustrative examples, the number of tools take the form of a number of vehicles. In one illustrative example, one or more technical solutions are present that overcome a technical problem with communicating data for a number of vehicles to an operator. The illustrative embodiments allow operators proximal to ground vehicles to be aware of various information related to the vehicles. Augmented reality for operators in an environment with a number of vehicles allows the operators to interact with the vehicles and ground equipment in real time and maintain an efficient and safe operation.

In the illustrative examples, one or more technical solutions provide visualizations of movement or status of a number of vehicles in an environment using a portable computing device. In the illustrative examples, one or more technical solutions provide indicators of at least one of a movement or a status of a number of vehicles in an environment using a portable computing device.

In the illustrative examples, one or more technical solutions use data from a number of vehicles in the environment to increase the safety of the environment for operators within the environment. In the illustrative examples, one or more technical solutions use data from a number of vehicles in the environment to result in improved efficiency of flight operations. In the illustrative examples, one or more technical solutions use data from a number of vehicles in the environment to result in improved communications in the environment. The illustrative examples improve at least one of efficiency, safety, or communication within an environment having autonomous ground vehicles.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An augmented reality system comprising:
   a number of vehicles within an environment, the number of vehicles configured to output data comprising at least one of a current position, an objective, a current movement status, a vehicle type, or a current power status; and
   an augmented reality device configured to receive the data from the number of vehicles, send a receipt signal from the augmented reality device to a communication system of each of the number of vehicles in response to receiving the data from the number or vehicles, wherein the receipt signal indicates to the number of vehicles that the augmented reality device received the data, and present augmented reality information in association with a live view of the environment in the augmented reality device using the data from the number of vehicles and an environment model, the augmented reality information comprising indicators associated with at least one of movement of the number of vehicles or status of the number of vehicles, wherein receipt signal indicates that a human operator is within the environment.

2. The augmented reality system of claim 1, wherein the augmented reality device is a portable computing device with a display device configured to display visual indicators of the augmented reality information.

3. The augmented reality system of claim 2, wherein the portable computing device comprises at least one of a speaker configured to produce an auditory indicator or vibration actuators configured to produce a haptic indicator.

4. A method of indicating movement of a number of vehicles within an environment, the method comprising:

receiving data from the number of vehicles within the environment by an augmented reality device, wherein the data comprises at least one of a current position, an objective, a current movement status, or a vehicle type;

sending a receipt signal from the augmented reality device to a communication system of each of the number of vehicles in response to receiving the data from the number of vehicles, wherein the receipt signal indicates to the number of vehicles that the augmented reality device received the data; and presenting augmented reality information in association with a live view of the environment in the augmented reality device using the data from the number of vehicles and an environment model, the augmented reality information being indicative of movement of the number of vehicles, wherein the receipt signal indicates that a human operator is within the environment.

5. The method of claim 4, wherein presenting the augmented reality information includes displaying augmented reality information associated with movement of the number of vehicles on a live view of the environment in the augmented reality device using the data.

6. The method of claim 5 further comprising:

receiving updated data from at least one vehicle of the number of vehicles within the environment, wherein the updated data comprises at least one of a current position, an objective, a current movement status, a vehicle type, or a current power status; and displaying updated augmented reality information associated with movement of the number of vehicles on a live view of the environment in the augmented reality device using the updated data.

7. The method of claim 5 further comprising:

identifying a path of a vehicle of the number of vehicles using the data and a model of the environment, and wherein displaying the augmented reality information comprises displaying a visual indicator representing the path.

8. The method of claim 5 further comprising:

identifying a movement area of a vehicle of the number of vehicles using the data and a model of the environment, and where displaying the augmented reality information comprises displaying a visual indicator representing the movement area.

9. The method of claim 5, wherein displaying the augmented reality information comprises displaying a keep out area on the live view of the environment.

10. The method of claim 5, wherein displaying the augmented reality information comprises displaying at least one of text or an icon over a vehicle of the number of vehicles.

11. The method of claim 10, wherein the at least one of text or the icon is representative of a current movement status of the vehicle or a current power status of the vehicle.

12. The method of claim 5 further comprising:

determining a field of view of the augmented reality device using a direction measured by a directional sensing unit of the augmented reality device; and selecting the augmented reality information to be displayed based on the field of view.

13. The method of claim 4 further comprising:

monitoring a location of the augmented reality device within the environment; and generating at least one of an auditory indicator or a haptic indicator in response to the augmented reality device, at least one of, moving into or approaching a keep out area or a movement area for a vehicle of the number of vehicles.

14. The method of claim 4, wherein presenting augmented reality information in association with a live view of the environment in the augmented reality device using the data from the number of vehicles and an environment model comprises generating at least one of an auditory indicator or a haptic indicator indicative of movement of the number of vehicles.

15. A method of indicating status of a number of tools within an environment:

receiving data from the number of tools within the environment by an augmented reality device, wherein the data comprises at least one of a current position, a current movement status, or a current power status;

sending a receipt signal from the augmented reality device to a communication system of each of the number of tools in response to receiving the data from the number of tools, wherein the receipt signal indicates to the number of tools that the augmented reality device received the data; and presenting augmented reality information in association with a live view of the environment in the augmented reality device using the data from the number of tools and an environment model, the augmented reality information being indicative of status of the number of tools, wherein the receipt signal indicates that a human operator is within the environment.

16. The method of claim 15, wherein presenting augmented reality information in association with a live view of the environment in the augmented reality device using the data from the number of tools and an environment model comprises displaying augmented reality information associated with status of the number of tools on a live view of the environment in the augmented reality device using the data, and wherein displaying the augmented reality information comprises displaying at least one of text or an icon over a tool of the number of tools.

17. The method of claim 16, wherein the at least one of text or the icon is representative of a current movement status of the tool or a current power status of the tool.

18. The method of claim 15 further comprising:

determining a field of view of the augmented reality device using a direction measured by a directional sensing unit of the augmented reality device; and selecting the augmented reality information to be presented based on the field of view.

19. An augmented reality system comprising:
a number of vehicles within an environment, the number of vehicles configured to output data comprising at least one of a current position, an objective, a current movement status, a vehicle type, or a current power status; and
an augmented reality device configured to receive the data from the number of vehicles, send a receipt signal from the augmented reality device to a communication system of each of the number of vehicles in response to receiving the data from the number or vehicles, wherein the receipt signal indicates to the number of vehicles that the augmented reality device received the data, and present augmented reality information in association with a live view of the environment in the augmented reality device using the data from the number of vehicles and an environment model, the augmented reality information comprising indicators associated with at least one of movement of the number of vehicles or status of the number of vehicles,
wherein the receipt signal includes a location of the augmented reality device within the environment.

20. A method of indicating movement of a number of vehicles within an environment, the method comprising:
receiving data from the number of vehicles within the environment by an augmented reality device, wherein the data comprises at least one of a current position, an objective, a current movement status, or a vehicle type;
sending a receipt signal from the augmented reality device to a communication system of each of the number of vehicles in response to receiving the data from the number of vehicles, wherein the receipt signal indicates to the number of vehicles that the augmented reality device received the data; and
presenting augmented reality information in association with a live view of the environment in the augmented reality device using the data from the number of vehicles and an environment model, the augmented reality information being indicative of movement of the number of vehicles,
wherein the receipt signal includes a location of the augmented reality device within the environment.

21. A method of indicating status of a number of tools within an environment:
receiving data from the number of tools within the environment by an augmented reality device, wherein the data comprises at least one of a current position, a current movement status, or a current power status;
sending a receipt signal from the augmented reality device to a communication system of each of the number of tools in response to receiving the data from the number of tools, wherein the receipt signal indicates to the number of tools that the augmented reality device received the data; and
presenting augmented reality information in association with a live view of the environment in the augmented reality device using the data from the number of tools and an environment model, the augmented reality information being indicative of status of the number of tools,
wherein the receipt signal includes a location of the augmented reality device within the environment.

* * * * *